(12) United States Patent
Luft et al.

(10) Patent No.: US 7,719,966 B2
(45) Date of Patent: *May 18, 2010

(54) NETWORK ELEMENT ARCHITECTURE FOR DEEP PACKET INSPECTION

(75) Inventors: Siegfried Johannes Luft, Vancouver (CA); Ping Chiang, Vancouver (CA)

(73) Assignee: Zeugma Systems Inc., Richmond (CA)

( * ) Notice: Subject to any disclaimer, the term of this patent is extended or adjusted under 35 U.S.C. 154(b) by 784 days.

This patent is subject to a terminal disclaimer.

(21) Appl. No.: 11/106,172

(22) Filed: Apr. 13, 2005

(65) Prior Publication Data

US 2006/0233101 A1    Oct. 19, 2006

(51) Int. Cl.
*H04L 12/26* (2006.01)
*H04L 12/56* (2006.01)

(52) U.S. Cl. .................. 370/229; 370/230.1; 370/252; 370/400

(58) Field of Classification Search ......... 370/229–237, 370/230.1, 236, 352, 395.2, 395.21, 400
See application file for complete search history.

(56) References Cited

U.S. PATENT DOCUMENTS

| | | | |
|---|---|---|---|
| 4,720,850 A | | 1/1988 | Oberlander et al. |
| 4,893,302 A | | 1/1990 | Hemmady et al. |
| 6,262,974 B1 | | 7/2001 | Chevalier et al. |
| 6,320,863 B1 | * | 11/2001 | Ramfelt ................... 370/404 |
| 6,412,000 B1 | * | 6/2002 | Riddle et al. .............. 709/224 |
| 6,587,470 B1 | | 7/2003 | Elliot et al. |
| 6,608,832 B2 | | 8/2003 | Forslow |
| 6,615,262 B2 | * | 9/2003 | Schweitzer et al. ......... 709/224 |
| 6,678,281 B1 | | 1/2004 | Chakrabarti et al. |
| 6,741,595 B2 | * | 5/2004 | Maher et al. ................ 370/392 |
| 6,779,030 B1 | | 8/2004 | Dugan et al. |
| 6,789,116 B1 | * | 9/2004 | Sarkissian et al. .......... 709/224 |

(Continued)

FOREIGN PATENT DOCUMENTS

CA    1 295 391    2/1992

(Continued)

OTHER PUBLICATIONS

"Delivering Video over IP," Microsoft Corporation, 2003.

(Continued)

*Primary Examiner*—Steven H Nguyen
*Assistant Examiner*—Candal Elpenord
(74) *Attorney, Agent, or Firm*—Blakely Sokoloff Taylor & Zafman LLP

(57) ABSTRACT

A method and apparatus for an application aware traffic shaping service node architecture is described. One embodiment of the invention, the service node architecture includes a set of one or more line cards, a set of one or more processor cards and a full mesh communication infrastructure coupling the sets of line and processor cards. Each link coupling the sets of line and processor cards is of equal capacity. A line card includes a physical interface and a set of one or policy network processors, with the network processors performing deep packet inspection on incoming traffic and shaping outgoing traffic. Processors cards include a set of one or more policy generating processors. According to another embodiment of the invention, the service node generates a set of statistics based on the incoming traffic and continually updates, in real-time, traffic shaping policies based on the set of statistics.

21 Claims, 17 Drawing Sheets

U.S. PATENT DOCUMENTS

| | | | |
|---|---|---|---|
| 6,807,156 B1 * | 10/2004 | Veres et al. ............... | 370/252 |
| 6,873,600 B1 | 3/2005 | Duffield et al. | |
| 6,948,003 B1 | 9/2005 | Newman et al. | |
| 6,961,539 B2 * | 11/2005 | Schweinhart et al. ...... | 455/12.1 |
| 6,985,431 B1 | 1/2006 | Bass et al. | |
| 7,002,977 B1 * | 2/2006 | Jogalekar ................... | 370/410 |
| 7,203,169 B1 * | 4/2007 | Okholm et al. ............ | 370/232 |
| 7,251,215 B1 * | 7/2007 | Turner et al. ............... | 370/231 |
| 7,257,616 B2 | 8/2007 | Bass et al. | |
| 7,272,115 B2 | 9/2007 | Maher, III et al. | |
| 7,376,731 B2 * | 5/2008 | Khan et al. ................ | 709/224 |
| 7,492,713 B1 | 2/2009 | Turner et al. | |
| 7,496,661 B1 | 2/2009 | Morford et al. | |
| 7,606,147 B2 * | 10/2009 | Luft et al. .................. | 370/229 |
| 2002/0016860 A1 | 2/2002 | Garcia-Luna-Aceves et al. | |
| 2002/0036983 A1 | 3/2002 | Widegren et al. | |
| 2002/0107908 A1 | 8/2002 | Dharanikota | |
| 2002/0116521 A1 | 8/2002 | Paul et al. | |
| 2002/0181462 A1 | 12/2002 | Surdila et al. | |
| 2003/0005112 A1 * | 1/2003 | Krautkremer ............... | 709/224 |
| 2003/0067903 A1 | 4/2003 | Jorgensen | |
| 2003/0108015 A1 * | 6/2003 | Li ............................. | 370/338 |
| 2003/0118029 A1 | 6/2003 | Maher et al. | |
| 2003/0229710 A1 * | 12/2003 | Lie et al. ................... | 709/231 |
| 2003/0235209 A1 * | 12/2003 | Garg et al. .................. | 370/468 |
| 2004/0013089 A1 * | 1/2004 | Taneja et al. ................ | 370/235 |
| 2004/0028051 A1 * | 2/2004 | Etemadi et al. ............ | 370/395.1 |
| 2004/0248583 A1 * | 12/2004 | Satt et al. ................... | 455/452.2 |
| 2005/0041584 A1 | 2/2005 | Lau et al. | |
| 2005/0068722 A1 | 3/2005 | Wei | |
| 2006/0028982 A1 | 2/2006 | Wright | |
| 2006/0077963 A1 * | 4/2006 | Li et al. ...................... | 370/352 |
| 2006/0101159 A1 * | 5/2006 | Yeh et al. .................... | 709/246 |
| 2006/0114832 A1 * | 6/2006 | Hamilton et al. ............ | 370/244 |
| 2006/0140119 A1 * | 6/2006 | Yeh et al. .................... | 370/235 |
| 2006/0140128 A1 * | 6/2006 | Chi et al. .................... | 370/241 |
| 2006/0149841 A1 * | 7/2006 | Strub .......................... | 709/225 |

FOREIGN PATENT DOCUMENTS

| | | |
|---|---|---|
| CA | 2 276 526 A1 | 7/1998 |
| CA | 2 511 997 A1 | 8/2004 |
| WO | WO 99/30460 | 6/1999 |
| WO | WO 03/094449 A1 | 11/2003 |
| WO | WO2005/017707 A2 | 2/2005 |

OTHER PUBLICATIONS

"What Is Unicast IPv4 Routing?" Microsoft TechNet, Microsoft Corporation, Mar. 28, 2003, pp. 1-6.

"How IPv4 Multicasting Works," Microsoft TechNet, Microsoft Corporation, Mar. 28, 2003, pp. 1-32.

"How Unicast IPv4 Routing Protocols and Services Work," Microsoft TechNet, Microsoft Corporation, Mar. 28, 2003, pp. 1-60.

PCT/CA2006/000555, PCT International Search Report and Written Opinion, Jul. 26, 2006.

PCT/CA2006/000554, PCT International Search Report and Written Opinion, Aug. 1, 2006.

PCT/CA2006/001414, PCT International Search Report and Written Opinion, Dec. 19, 2006.

PCT/CA2006/001423, PCT International Search Report and Written Opinion, Dec. 18, 2006.

PCT/CA2006/001469, PCT International Search Report and Written Opinion, Dec. 28, 2006.

Bodin, U., et al., "End-to-End QoS control architectures from a wholesale and retail perspective: benefits and challenges." [retrieved Apr. 19, 2007]. Retrieved from the Internet: www.operax.com. Operax, Tegeluddsvägen 92, SE-115 28, Stockholm, Sweden.

Gallon, C., et al., MSF Technical Report, MSF-TR-ARCH-005-FINAL. "Bandwidth Management in Next Generation Packet Networks." MultiService Forum. Aug. 2005.

Jungck, Peder, "Open Network Services Platforms for High-Value Network Services", [online], 2004 [retrieved Feb. 28, 2007]. Retrived from the Internet: CloudShield Technologies, Inc., www.cloudshield.com. CloudShield, 212 Gibraltar Drive, Sunnyvale, California 94089.

"Administrator, Developer and Partner Training Courses." [online] CloudShield Technologies, Inc., 2006 [retrieved Feb. 28, 2007]. Retrieved from the Internet: <URL: http://www.cloudshield.com/pdfs/training_course_Descriptions.pdf>.

"Arbor Peakflow SP on CS-2000: CloudShield and Arbor Networks Integrated Solution for DDoS Control." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"Bandwidth-on-Demand Solution." [retrieved Apr. 19, 2007]. Retrieved from the Internet: www.operax.com. Operax, Tegeluddsvägen 92, SE-115 28, Stockholm, Sweden. 2005.

"Broadband Architectures to Go Above and Beyond Triple Play." Sep. 2005. [retrieved Feb. 28, 2007]. Retrieved from the Internet: www.operax.com. Operax, Tegeluddsvägen 92, SE-115 28, Stockholm, Sweden.

"CloudShield Content Control Suite: Modular Software for Implementing Multi-Function Service Control." 2006. [retrieved Feb. 28, 2008]. Retrieved from the Internet: CloudShield Technologies, Inc., www.cloudshield.com. CloudShield, 212 Gibraltar Drive, Sunnyvale, California 94089.

"CloudShield Network Observatory: CS-2000 with $3^{rd}$ Party Applications Bring Network Content Into Focus." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"CloudShield PacketWorks IDE: Developers' Toolkit for CS-2000 In-Network Computing Platform." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"CS-2000 Content Processing Platform: Multi-Function Systems for Controlling and Securing Next Generation Services." 2006. [retrieved Feb. 28, 2007]. Retrieved from the Internet: CloudShield Technologies, Inc., www.cloudshield.com. CloudShield, 212 Gibraltar Drive, Sunnyvale, California 94089.

"Efficient Network Resource Control—A Source of Competitive Advantage." Sep. 2005. Operax, Tegeluddsvägen 92, SE-115 28, Stockholm, Sweden.

"Ellacoya Introduces VoIP Quality Reporter (VQR)." [online] Ellacoya Networks, Inc., 2007. [retrieved Apr. 19, 2007] Retrieved from the Internet: <URL: http://www.ellacoya.com/products/vgr.shtml>.

"Ellacoya Multimedia Service Manager (MSM) PacketCable Multimedia-based Application." [online] Ellacoya Networks, Inc., 2007. [retrieved Apr. 19, 2007] Retrieved from the Internet: <URL: http://www.ellacoya.com/products/multimediaMgr.shtml>.

"Ellacoya's Scalable Distributed Architecture." [online] Ellacoya Networks, Inc., 2007. [retrieved Apr. 19, 2007] Retrieved from the Internet: <URL: http://www.ellacoya.com/products/architecture.shtml>.

"Guarantee QoS for IPTV with Operax Bandwidth Manager." [retrieved Apr. 19, 2007]. Retrieved from the Internet: www.operax.com. Operax, Tegeluddsvägen 92, SE-115 28, Stockholm, Sweden. 2006.

"How IPv4 Multicasting Works," Microsoft TechNet, Microsoft Corporation, Mar. 28, 2003, pp. 1-32.

"How Unicast Ipv4 Routing Protocols and Services Work," Microsoft TechNet, Microsoft Corporation, Mar. 28, 2003, pp. 1-60.

"IMS and Operax Bandwidth Manager—Guaranteed QoS." [retrieved Apr. 19, 2007]. 2006. Retrieved from the Internet: www.operax.com. Operax, Tegeluddsvägen 92, SE-115 28, Stockholm, Sweden.

"Integrating Applications with the CloudShield ONSP." Aug. 2004. CloudShield Technologies, Inc., www.cloudshiled.com. CloudShield, 212 Gibraltar Drive, Sunnyvale, California 94089.

"Integrated Content Control for An All IP World." [retrieved Feb. 28, 2007]. Retrieved from the Internet: CloudShield Technologies, Inc., www.cloudshiled.com. CloudShield, 212 Gibraltar Drive, Sunnyvale, California 94089.

"IP Service Control System." 2005. [retrieved Apr. 19, 2007] Retrieved from the Internet: Ellacoya Networks, Inc., www.ellacoya.com. Ellacoya Networks, 7 Henry Clay Drive, Merrimack, NH 03054 USA.

"Managed DDoS Security Services: An Arbor Networks/ CloudShield Solution." Aug. 2004. CloudShield Technologies, Inc., www.cloudshield.com. CloudShield, 212 Gibraltar Drive, Sunnyvale, California 94089.

"Meeting the Multi-Service IP QoS Challenges." 2005. [retrieved Apr. 19, 2007]. Retrieved from the Internet: www.operax.com. Operax, Tegeluddsvägen 92, SE-115 28, Stockholm, Sweden.

"On the Road to IP Multi-Service." 2005. [retrieved Apr. 19, 2007]. Retrieved from the Internet: www.operax.com. Operax, Tegeluddsvägen 92, SE-115 28, Stockholm, Sweden.

"Operax Bandwidth Manager 5500: QoS control for the access, aggregation and edge." 2006. [retrieved Apr. 19, 2007]. Retrieved from the Internet: www.operax.com. Operax, Tegeluddsvägen 92, SE-115 28, Stockholm, Sweden.

"Operax Bandwidth Manager 5700: QoS control for IP/MPLS Networks." 2006. [retrieved Apr. 19, 2007]. Retrieved from the Internet: www.operax.com. Operax , Tegeluddsvägen 92, SE-115 28, Stockholm, Sweden.

"Operax guarantees QoS for Video Telephony: QoS guaranteed value added services." 2005. [retrieved Apr. 19, 2007]. Retrieved from the Internet: www.operax.com. Operax, Tegeluddsvägen 92, SE-115 28, Stockholm, Sweden.

"Operax in IP Multimedia Subsystem (IMS): Advanced QoS control for IMS/NGN." 2006. [retrieved Apr. 19, 2007]. Retrieved from the Internet: www.operax.com. Operax, Tegeluddsvägen 92, SE-115 28, Stockholm, Sweden.

"Operax Triple Play: Service Control System." 2005. [retrieved Apr. 19, 2007]. Retrieved from the Internet: www.operax.com. Operax, Tegeluddsvägen 92, SE-115 28, Stockholm, Sweden.

"Prolexic DNS Shield on CS-2000: Prolexic and CloudShield Integrated Solution for DNS Service Protection." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"A Unified Policy Management Framework: IP Service Creation and Assurance in Converged Networks." Nov. 2006. Operax, Tegeluddsvägen 92, SE-115 28, Stockholm, Sweden.

"What is Unicast IPv4 Routing?" Microsoft TechNet, Microsoft Corporation, Mar. 28, 2003, pp. 1-6.

* cited by examiner

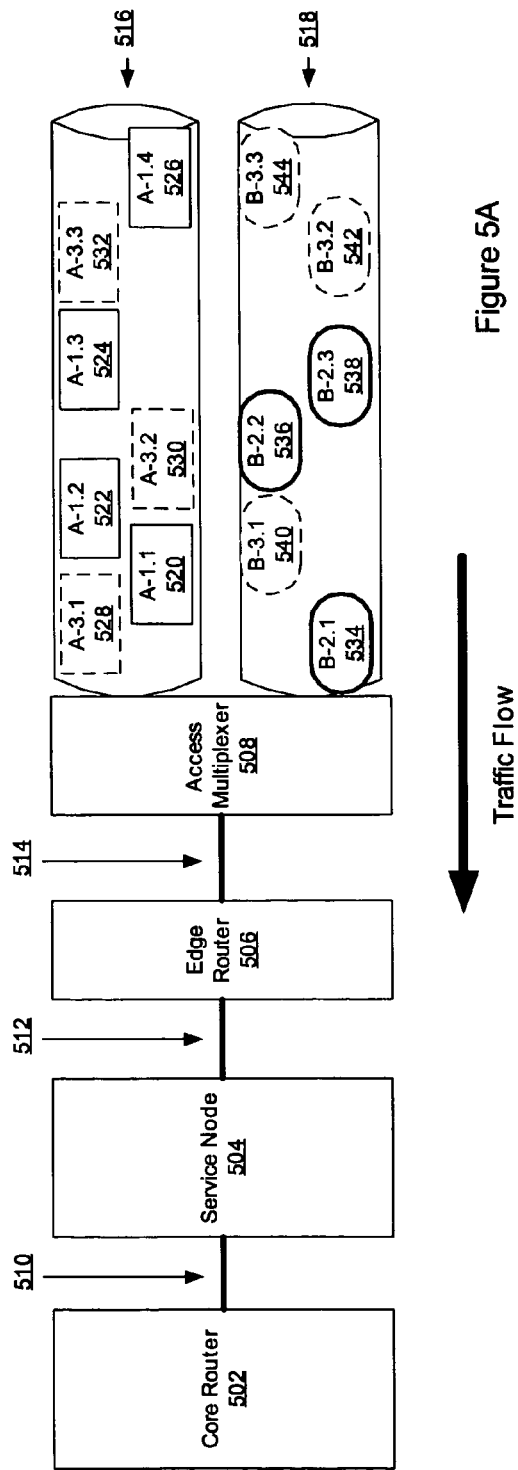
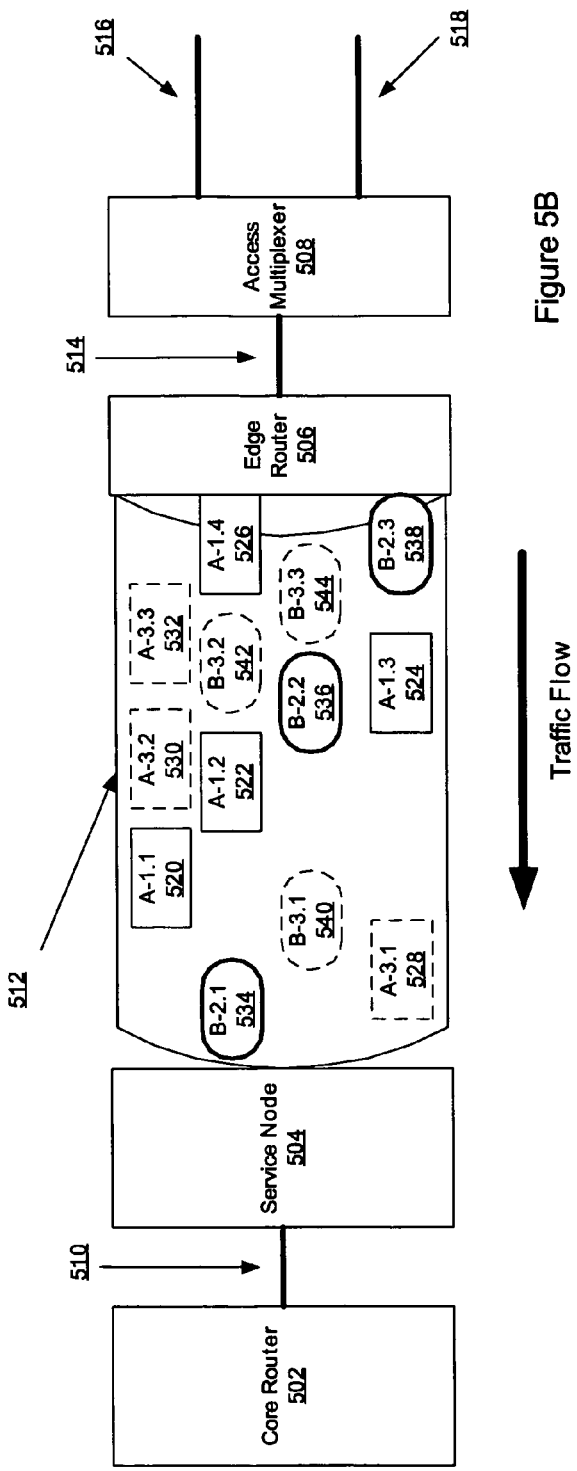

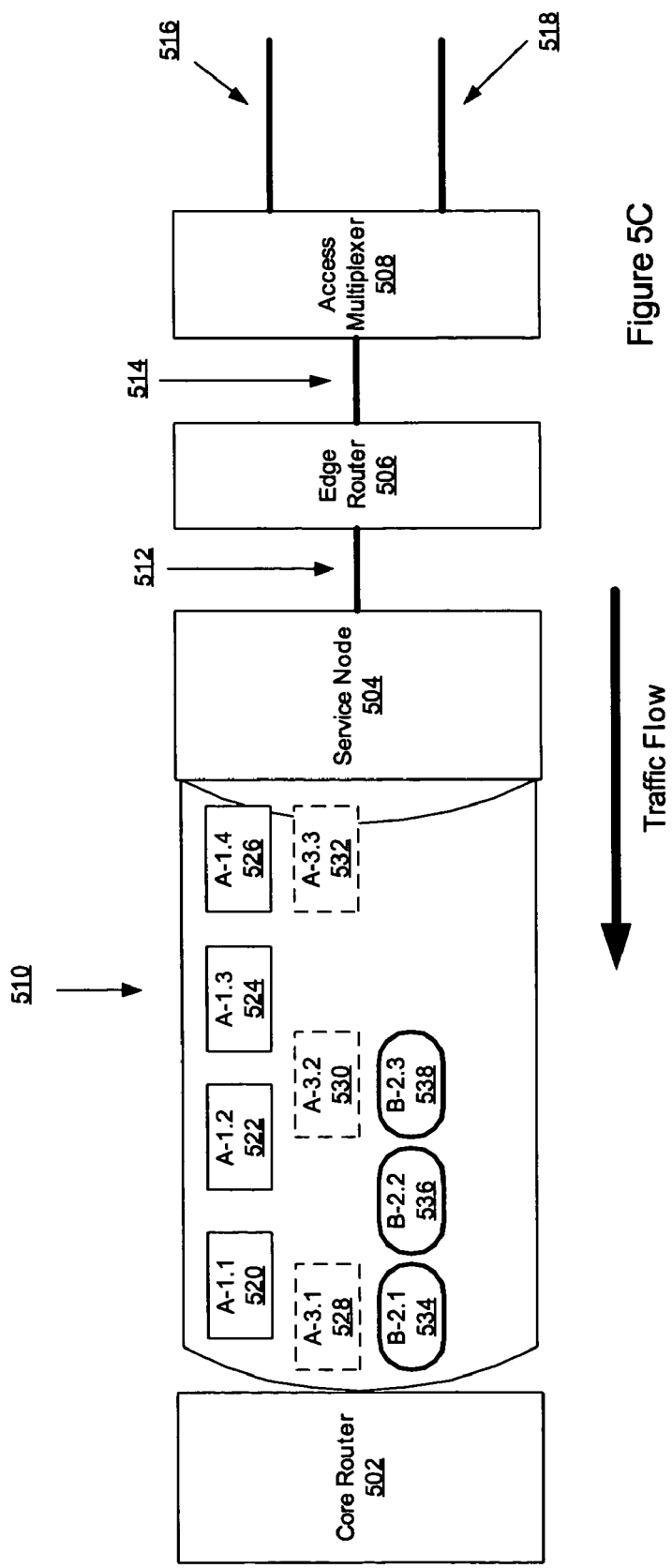

NETWORK ELEMENT ARCHITECTURE FOR DEEP PACKET INSPECTION

CROSS-REFERENCE TO RELATED APPLICATIONS

This patent application is related to the co-pending U.S. Patent Application, entitled AN APPLICATION AWARE TRAFFIC SHAPING SERVICE NODE POSITIONED BETWEEN THE ACCESS AND CORE NETWORKS, Ser. No. 11/106,163 filed on Apr. 13, 2005.

BACKGROUND

1. Field

Embodiments of the invention relate to the field of computer networking; and more specifically, to shaping data traffic in a computer network.

2. Background

A modern metro area network 100 is composed of two types of networks: a core network 102 and one of more access networks 106. The core network 102 communicates data traffic from one or more service providers 104A-104N in order to provide services to one or more subscribers 108A-108M. Services supported by the core network 102 include, but are not limited to, (1) a branded service, such as a Voice over Internet Protocol (VoIP), from a branded service provider; (2) a licensed service, such as Video on Demand (VoD), through a licensed service provider and (3) traditional Internet access through an Internet Service Provider (ISP).

The core network supports a variety of protocols (Synchronous Optical Networking (SONET), Internet Protocol (IP), Packet over SONET (POS), Dense Wave Division Multiplexing (DWDM), OSPF, BGP, ISIS, etc.) using various types of equipment (core routers, SONET add-drop multiplexers (ADM), DWDM equipment, etc.). Furthermore, the core network communicates data traffic from the service providers 104A-104N to access network(s) 106 across link(s) 112. Link (s) 112 may be a single optical, copper or wireless link or may comprise several such optical, copper or wireless link(s).

On the other hand, the access network(s) 106 complements the core network 102 by aggregating the data traffic from the subscribers 108A-108M. Access network(s) 106 may support data traffic to and from a variety of types of subscribers 108A-108M, (e.g. residential; corporate, mobile, wireless, etc.). Although the access network(s) 106 may not comprise of each of the types of subscriber (residential, corporate, mobile, etc), access(s) network 106 will comprise at least one subscriber. Typically, access network(s) 106 supports thousands of subscribers 108A-108M. Access network(s) 106 aggregates data traffic from the subscribers over link(s) 112 connecting to the core network 102. Access networks support a variety of protocols (IP, Asynchronous Transfer Mode (ATM), Frame Relay, Ethernet, Digital Subscriber Line (DSL), Dynamic Host Configuration Protocol (DHCP), Point-to-Point Protocol (PPP), Point-to-Point Protocol over Ethernet (PPPoE), etc.) using various types of equipment (Edge router, Broadband Remote Access Servers (BRAS), Digital Subscriber Line Access Multiplexers (DSLAM), Switches, etc). The access network(s) 106 uses subscriber policy manager(s) 110 to set policies for individual ones and/or groups of subscribers. Policies stored in a subscriber policy manager(s) 110 allow subscribers access to different ones of the service providers 104A-N. Examples of subscriber policies are bandwidth limitations, traffic flow characteristics, amount of data, allowable services, etc.

Before discussing subscriber policies and the effect on services, it is worth noting that data traffic is transmitted in data packets. A data packet (also known as a "packet") is a block of user data with necessary address and administration information attached, usually in a packet header and/or footer that allows the data network to deliver the data packet to the correct destination. Examples of data packets include, but are not limited to, IP packets, ATM cells, Ethernet frames, SONET frames and Frame Relay packets. Data packets are transmitted in a flow at a transmission rate. The transmission rate is determined by the packet size and the transmission gap (or "inter-packet gap") between each packet. In addition, the transmission rate of data packets is dependent on the capacity of the network connection and processor capability of the transmitting device.

FIG. 2 represents the Open Systems Interconnect (OSI) model of a layered protocol stack for transmitting data packets 200. Each layer installs its own header in the data packet being transmitted to control the packet through the network. The physical layer (layer 1) 202 is used for the physical signaling. The next layer, data link layer (layer 2) 204, enables transferring of data between network entities. The network layer (layer 3) 206 contains information for transferring variable length data packet between one or more networks. For example, IP addresses are contained in the network layer 206, which allows network devices to route the data packet. Layer 4, the transport layer 208, provides transparent data transfer between end users. The session layer (layer 5) 210, provides the mechanism for managing the dialogue between end-user applications. The presentation layer (layer 6) 212 provides independence from difference in data representation (e.g. encryption, data encoding, etc.). The final layer is the application layer (layer 7) 212. The layer contains the actual data used by the application sending or receiving the packet. While most protocol stacks do not exactly follow the OSI model, it is commonly used to describe networks.

Returning to FIG. 1, bandwidth sensitive services, such as VoIP or VoD, require a dedicated bandwidth over link(s) 112 to properly operate. However, because each access network 106 can support thousands of subscribers, link(s) 112 can get overloaded and not provide enough bandwidth for these bandwidth sensitive services. Subsequently, the quality of these services degrades or becomes interrupted altogether. One solution to this problem is to enforce a Quality of Service (QoS) from the core 102 and/or access 106 networks. QoS allocates different bandwidth rates to different types of data traffic. For example, QoS can be set up to allocate a bandwidth of 20 Mbps for VoIP service over link(s) 112. In addition, QoS shapes the data traffic by re-transmitting the data traffic in a constant rate. However, for QoS to work properly, both the core and access networks must be set up to support the desired QoS policy.

Devices that solely perform QoS can be categorized, but not limited to, either traffic shapers or flow switches. A traffic shaper is a device that classifies a packet by deep packet inspection and transmits the packet based on pre-determined subscriber policies. Turning to FIG. 2, deep packet inspection examines the data contained in layers up to and including application layer 214 of each data packet 200 to determine what quality or service should be used for the packet. For example and by way of illustration, deep packet inspection matches the structure of the application layer data with potentially hundreds of known application data types. This allows a traffic shaper to finely tune the quality of service enforced. For example, a traffic shaper may identify control packets for an adaptable video conferencing protocol to configure the network for an optimal video conferencing rate.

Although existing traffic shapers are subscriber aware, these traffic shapers only enforce pre-determined subscriber policies. That is subscribers policies are set by the operator of the traffic shaper and do not change until the operator modifies the subscriber policies. This does not allow subscriber policies to change in real-time based on existing network conditions. Furthermore, existing traffic shapers cannot handle the high volume of data traffic that cross the core 102 and access 116 networks.

On the other hand, flow switches are network devices that transmit data packets in connected flows, instead of discrete packets. Flow switches operate on groups of similar packets to provide QoS for an application. However, flow switches have limited data traffic processing capability, are not subscriber aware, perform limited or no deep packet inspection, and cannot update subscriber policies in real-time.

BRIEF SUMMARY

A method and apparatus for an application aware traffic shaping service node architecture is described. One embodiment of the invention, the service node architecture includes a set of one or more line cards, a set of one or more processor cards and a full mesh communication infrastructure coupling the sets of line and processor cards. Each link coupling the sets of line and processor cards is of equal capacity. A line card includes a physical interface and a set of one or policy network processors, with the network processors performing deep packet inspection on incoming traffic and shaping outgoing traffic. Processors cards include a set of one or more policy generating processors. According to another embodiment of the invention, the service node generates a set of statistics based on the incoming traffic and continually updates, in real-time, traffic shaping policies based on the set of statistics.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, core network 102 can be located in FIG. 1. However, element numbers are the same for those elements that are the same across different Figures. In the drawings:

FIG. 5A is a block diagram illustrating one embodiment of unshaped network data traffic flow originating from subscribers.

FIG. 5B is a block diagram illustrating one embodiment of unshaped network data traffic flow from subscribers aggregated by the access multiplexer and edge router according to one embodiment of the invention.

FIG. 5C is a block diagram illustrating one embodiment of network data traffic flow from subscribers shaped by the traffic shaping service node.

DETAILED DESCRIPTION

Figure 1:
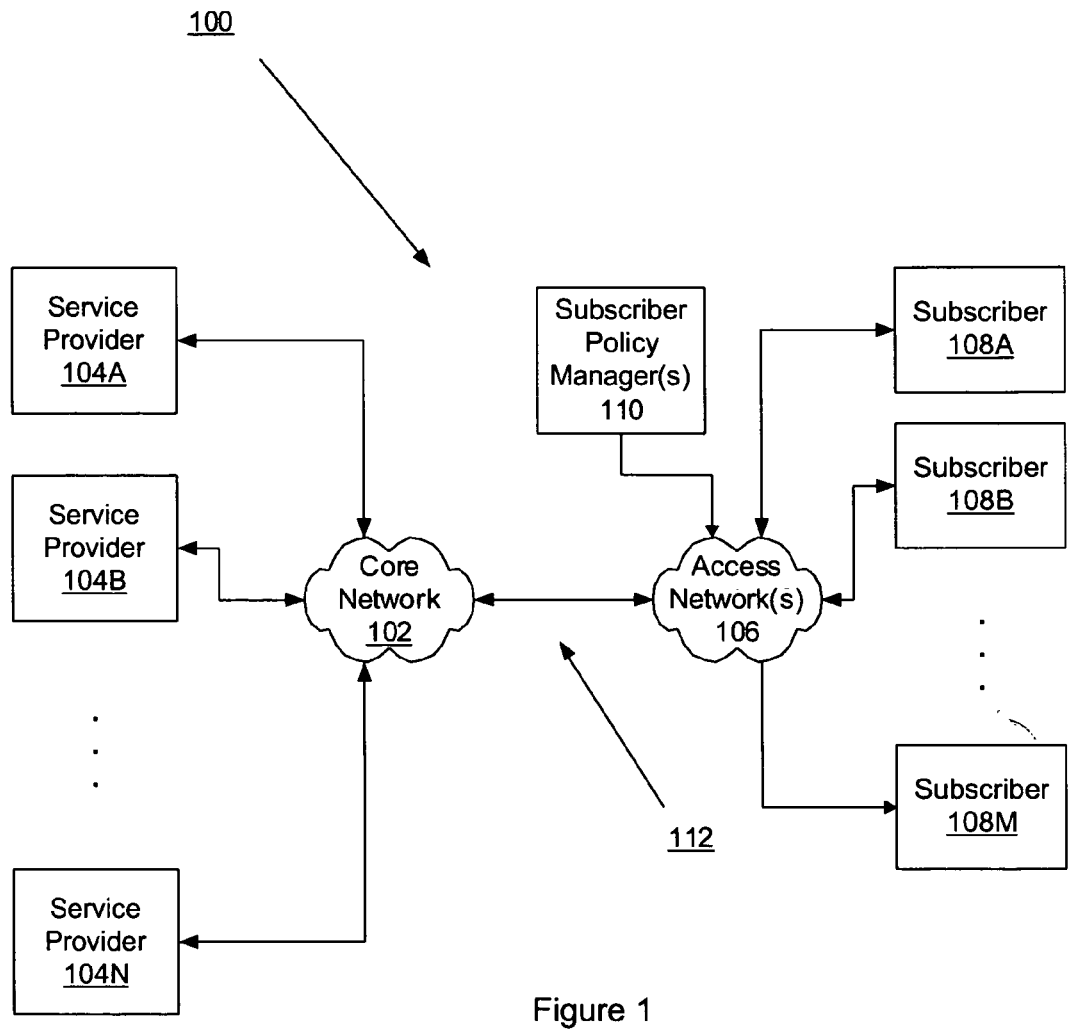
FIG. 1 (Prior Art) is illustrates one embodiment of a metro area network configuration.

In the following description, numerous specific details such as application subscriber data traffic flow, traffic policy, data packet, processor card, line card, deep packet inspection and interrelationships of system components are set forth in order to provide a more thorough understanding of the invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the term "coupled," along with its derivatives, is used. "Coupled" may mean that two or more elements are in direct physical or electrical contact. However, "coupled" may also mean that two or more elements are not in direct contact with each other, but yet still co-operate or interact with each other.

A method and apparatus for an application traffic shaping service node positioned between the access and core networks is described. One embodiment of the invention enforces a per subscriber, per application traffic policy for network traffic between subscribers and service providers. According to another embodiment of the invention enforcement of the per subscriber, per application traffic policy comprises classifying the network traffic into application level subscriber flows, maintaining real-time statistics on the application level subscriber flows, updating, in real-time, the per subscriber, per application traffic policy based on the real-time statistics and shaping the application level subscriber flows as necessary to enforce the per subscriber, per application traffic policy. Yet another embodiment of the invention is a combined service node with integrated edge routing and traffic aggregator.

Furthermore, embodiments of the traffic shaping service node architecture are described. One architecture embodiment of the invention describes a high speed connection between a line card and a multiple CPU processor card. According to another architectural embodiment of the invention, a full mesh backplane connects a plurality of line and multiple CPU processor cards. According to another embodiment of the invention, the line card comprise a network processor, host CPU, protocol queue, statistics queue and physical interface. According to another embodiment of the invention, the processor card comprises multiple CPUs connected via a very high capacity low latency (VHCLL) bus connecting the multiple CPUs to the backplane.

Since each of the above embodiments is independent, different embodiments may implement different ones, different combinations, or all of the above aspects of the invention. For example, certain embodiments of the invention include a service node that enforces a per subscriber, per application traffic policy for network traffic between subscribers and service providers where the service node employs an architecture with a full mesh backplane between the plurality of line and processor cards.

Exemplary embodiments of the invention will now be described with reference to FIGS. 3-16. In particular, the operations of the flow diagrams in FIGS. 6-10 will be described with reference to the exemplary embodiments of FIGS. 3-5 and 11-16. However, it should be understood that the operations of these flow diagrams can be performed by embodiments of the invention other than those discussed with reference to FIGS. 6-10, and that the embodiments discussed with reference to FIGS. 6-10 can perform operations different than those discussed with reference to these flow diagrams.

Exemplary Traffic Shaping Service Node

Figure 3:
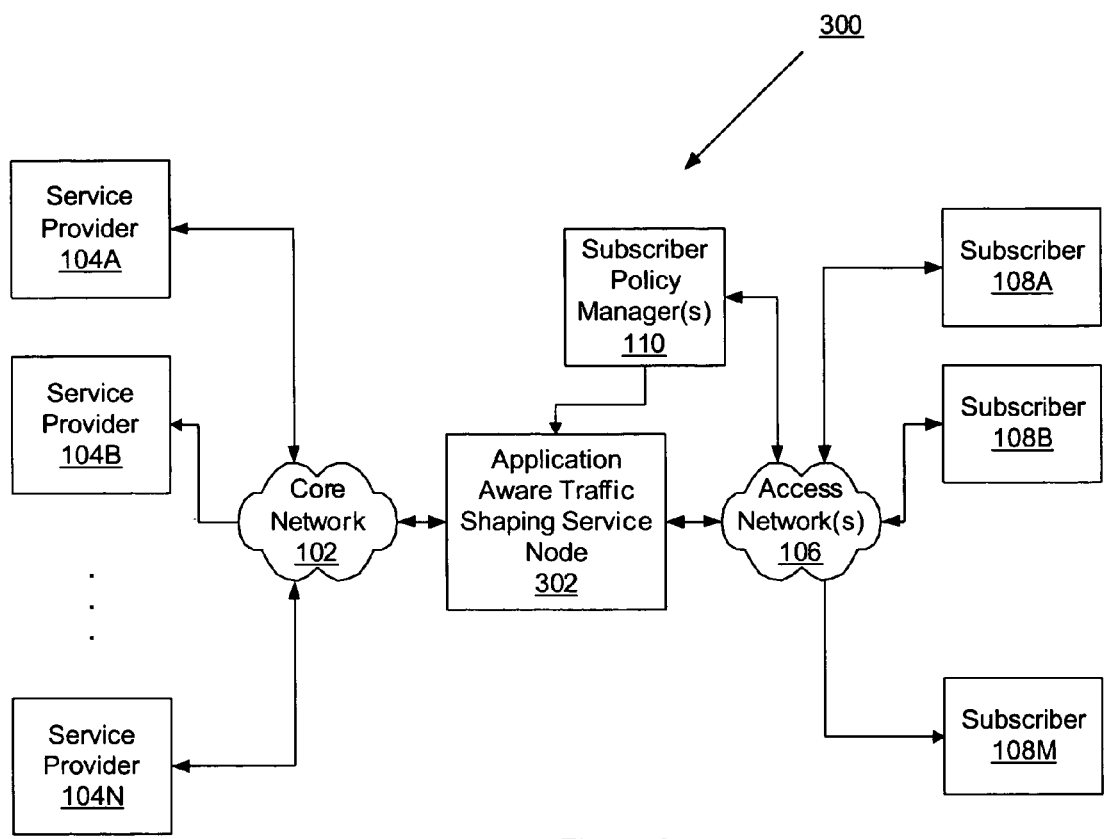
FIG. 3 illustrates an exemplary network configuration using a traffic shaping service node shaper in a metro area network according to one embodiment of the invention.

FIG. 3 illustrates an exemplary network configuration using a traffic shaping service node 302 in a metro area network according to one embodiment of the invention. In FIG. 3, traffic shaping service node 302 is communicatively coupled between the core 102 and access 106 networks. While one embodiment is described or which the traffic shaping service node may shape traffic traveling in either direction, alternative embodiments may shape in only one direction (e.g., the service provider data traffic coming from the core network 102. Traffic shaping, a form of QoS, is the process of regulating and smoothing the flow of network data traffic within a computer network. Restricting the bandwidth of the traffic flow is one way to regulate data traffic. There are a variety of ways to bring data traffic flow with a desired rate, including dropping or discarding data packets buffering received data packets and re-transmitting the data packets at the desired rate, combinations of these (e.g., buffering packets when there is space in the buffer and dropping packets when there is not), etc. Buffering the data traffic flow allows the traffic shaping service node to smooth the data traffic flow. Smoothing removes the bursts of data traffic and shapes the data traffic into a constant flow of data traffic. Smoothing is advantageous for applications that depend on a constant flow of data traffic. For example, video-based applications, such VoD or video conferencing, or real-time voice applications (VoIP) benefit from a constant flow of data traffic. An example of shaping service provider data traffic is further described in FIGS. 4A and 4B. Shaping aggregated subscriber data traffic coming from the access network(s) 106 is further described in the FIG. 5A-5C. Referring back to FIG. 3, the traffic shaping service node 302 uses the subscriber policies contained in subscriber policy manager(s) 110 for instruction on how to shape the data traffic from service providers 104A-104N and/or subscribers 108A-108M accordingly.

Figure 4A:
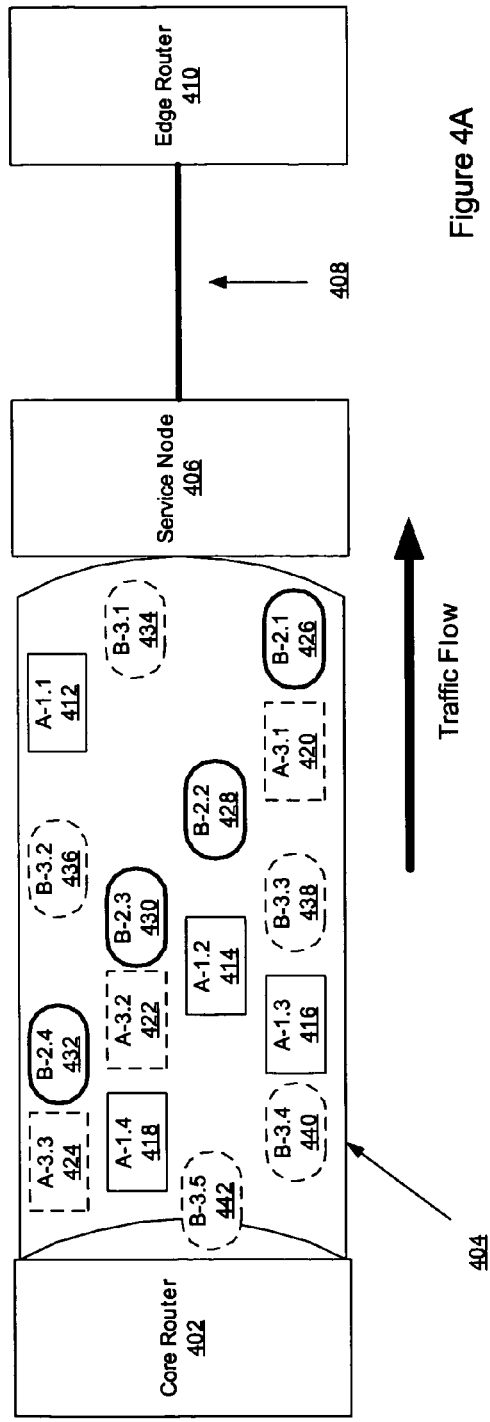
FIG. 4A is a block diagram illustrating one embodiment of unshaped network data traffic flow originating from the core network according to one embodiment of the invention.

FIG. 4A is a block diagram illustrating one embodiment of unshaped network data traffic flow originating from the core network. FIG. 4A is an embodiment coupling a core router 402 with a traffic shaping service node 406 via link 404. Traffic shaping service node 406, in turn, is coupled with edge router 410 via link 408. In FIG. 4A, by way of illustration, a core router 402 transmits several data packets over link 404 to the traffic shaping service node 406. Typically, the core router 402 transmits millions of packets per second. FIG. 4A is a conceptual drawing representing that each packet typically includes some identification of the application used (e.g., an ID in the header, type of protocol used, etc.). As such, each packet illustrated in FIG. 4 is labeled with the subscriber, the application used by the data packet, a number representing the ordered position of the data packet in a flow of similar packets. For example, data packet 412, labeled "A-1.1", designates the packet is used by subscriber A, application 1 and is the first packet in a flow of packets used by subscriber A and application 1. As another example, packet 438, labeled "B-3.3", means the packet is for subscriber B, application 3 and is the third such packet in the flow for this application and subscriber.

Furthermore, FIG. 4A illustrates application subscriber traffic flows. An application subscriber traffic flow is a flow of data packets that are particular to a unique combination of subscriber, application and instance of that application. For example, packets 412-416 are organized into an application subscriber traffic flow for subscriber A, application 1 ("packet flow A-1"). Similarly, packets 420-424 (packet flow "A-3"), 426-432 (packet flow "B-2") and 434-442 (packet flow "B-3") are organized into different application subscriber traffic flows. Only four such flows are illustrated in FIG. 4. Typically, the traffic shaping service node 406 handles millions of application subscriber traffic flows at a time.

However, the packets in the flows on link 404 are illustrated to indicate they are mixed together in disorderly flows of packets. Disorderly means the packet flow is not a constant stream of packets within the flow. For example, in packet flow A-1, packet 412 ("A-1.1") is relatively far away from packet 414 ("A-1.2"), whereas packet 414 is relatively close to packets 416 ("A-1.3") and 418 ("A-1.4"). The wide varying gaps between the packets can cause dropped packets and failed services. For example, if the gap between the packets is too large, then bandwidth sensitive services such as VoIP or VoD will fail because the steady flow of video becomes disrupted. Conversely, if the packets are bunched too close together, then packets can be dropped because the rate of packets exceeds the bandwidth allocated to the subscriber or the capacity of the network. Dropped packets can severely disrupt video or real-time audio services. Packet flow A-3 (packets 420-424), B-2 (packets 426-432) and packet flow B-3 (packets 434-442) are similarly disorderly arranged.

Figure 4B:
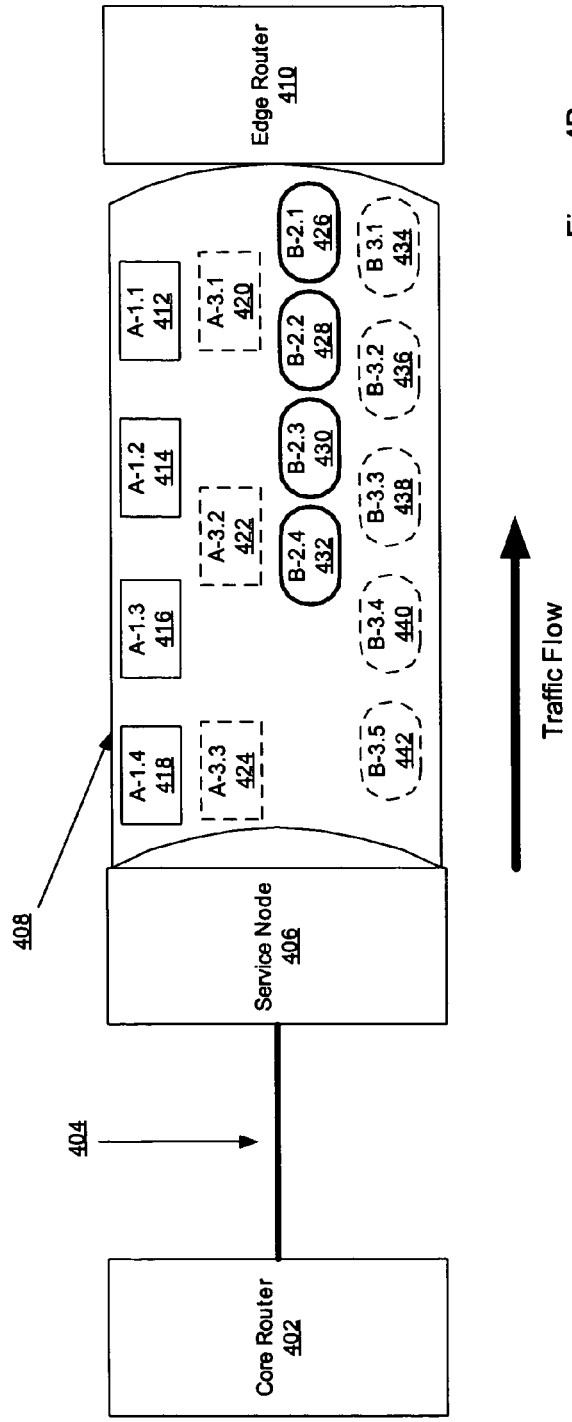
FIG. 4B is a block diagram illustrating one embodiment of network data traffic flow shaped by the traffic shaping service node according to one embodiment of the invention.

FIG. 4B is a block diagram illustrating one embodiment of network data traffic flow shaped by the traffic shaping service node 406. Similar to FIG. 4A, core router 402 is linked to traffic shaping service node 406 via link 404. Traffic shaping service node 406, in turn, is connected with edge router 410 via link 408. However in FIG. 4B, the same flow of packets from FIG. 4A are now ordered into application subscriber traffic flows on link 408.

In addition to organizing the data packets, the traffic shaping service node 406 applies the policies to the application subscriber traffic flows when transmitting the data packets. FIG. 4B illustrates the application of the policies to the four application subscriber traffic flows. Typically, the traffic shaping service node 406 shapes thousands of application subscriber traffic flows. One of the policies that may be applied to the traffic flows is to transmit each packet within a traffic flow at a certain transmission rate. For example, in FIG. 4B, packets 412-418 in packet flow A-1 are now transmitted at a regularly spaced interval. This is in contrast to FIG. 4A, where packets 412-418 are in a disorderly flow. Packet flows A-3 (packets 420-424), B-2 (packets 426-432) and B-3 (packets 434-442) are likewise transmitted in regularly spaced intervals.

It should be understood that different flows may transmit at different rates. In FIG. 4B, the spacing of packets is used to conceptually illustrate this in that inter-packet gaps are different for each pair of packets in the data flow. For example, packets 412-418 in packet flow A-1 are transmitted at a higher rate than packets 420-424 in packet flow A-3 because the inter-packet gap for packet 412-418 is smaller than for packets 420-424. Similarly, packets 426-432 in packet flow B-2 have the smallest inter-packet gap of the four application traffic flows and transmits at the fastest rate. Finally, packets 434-442 in packet flow B-3 are transmitted at a lower rate than packets 426-432 in packet flow B-2, although packet flow B-3 transmits at a higher rate than packets 412-418 and 410-424.

As illustrated in FIG. 4B, traffic shaping service node 406 transmits different application subscriber traffic flows at different rates. The need for the different rates depends on the application and the subscriber policy. For example, web traffic typically does not require high transmission rate because generally, web page retrieval is not time sensitive. However, DVD-quality VoD requires a high data traffic rate to enable an interruption free viewing experience. Thus, different applications require different traffic rates for the packet data flows. Furthermore, each subscriber may have different policies. For example, subscriber A's policy allows web page retrieval at 1.0 megabits per second (Mbps), whereas subscriber B's policy allows web page retrieval at 5.0 Mbps. This idea is reflected in FIG. 4B, where application traffic flows A-3 and B-3 transmit at different rate although the packets for each flow refer to the same application.

FIG. 5A is a block diagram illustrating one embodiment of unshaped network data traffic flow originating from the access network. Links 516 and 518 are coupled with access multiplexer 508. The access multiplexer 508 aggregates the data traffic from links 516 and 518. Access multiplexer 508 is further coupled to edge router 506 by link 514. Edge router 506 is in turn coupled to traffic shaping service node 504 through link 512. Finally, traffic shaping service node 504 is coupled to core router 502 via link 510. In FIG. 5A, the data traffic from subscriber A is shown for application 1 (packets 520-526) and application 2 (packets 528-532) on link 516. Similar to the data traffic illustrated in FIG. 4A, the data traffic from subscriber A is mixed together in two disorderly flows. Similarly, data traffic from subscriber B is likewise is disordered for packets 534-538 and 540-544 on link 518.

FIG. 5B is a block diagram illustrating one embodiment of unshaped network data traffic flow from subscribers aggregated by the access multiplexer. FIG. 5B has a similar network configuration as FIG. 5A. Core router is coupled to traffic shaping service node by link 510. Link 512 couples traffic shaping service node 504 and edge router 506. Furthermore, edge router 506 coupled to access multiplexer 508 via link 514. Links 516 and 518 couple with access multiplexer 508.

In FIG. 5B, the access multiplexer receives the data packets 520-532 from link 516 and data packets 534-544 from link 518. The access multiplexer 508 aggregates the subscriber data packets and transmits data packets 520-544 to the edge router along link 514. The edge router receives data packets 520-544 and re-transmits data packets 520-544 to the traffic shaping service node on link 512. In FIG. 5B, the edge router transmits the subscriber data packets 520-544 in a disorderly flow because the packets are received in a disorderly fashion.

FIG. 5C is a block diagram illustrating one embodiment of network data traffic flow from subscribers shaped by the traffic shaping service node. FIG. 5C has a similar network configuration as FIG. 5A. Core router is coupled to traffic shaping service node by link 510. Link 512 is coupled traffic shaping service node 504 and edge router 506. Furthermore, edge router 506 is coupled to access multiplexer 508 via link 514. Links 516 and 518 couple with access multiplexer 508.

In FIG. 5C, and similar to FIG. 4B, the traffic shaping service node organizes the received data packets into application subscriber data flows (flow "A-1" (packets 520-526), flow "A-3" (packets 528-532) and flow "B-2" (packets 534-538)). Flow B-3 (packets 540-544) is not transmitted because the policy for subscriber B does not allow subscriber B to use application 3. For example, application 3 maybe a value-added service such as VoD. Instead of transmitting flow B-3 (packets 540-544), traffic shaping service node 504 drops packets 540-544. This action effectively disallows subscriber B from using application 3. Thus, traffic shaping service node effectively blocks a connection between subscriber B and the application associated with flow B-3. In contrast, subscriber A's policy allows subscriber A to use application 3.

While in embodiments illustrated in FIGS. 4A-B and 5A-C shape and block traffic in one direction, alternate embodiments may shape and/or block traffic in both directions (e.g. shaping traffic coming from and/or going to access networks, blocking connections between subscribers and service providers, etc.) and/or combination thereof (e.g., shape traffic in one direction and block connections in the other direction, shape traffic in both directions, block connections in both directions and shape traffic in one direction, etc.). In addition, as previously described, shaping includes dropping of packets. While embodiments of the invention shape in one and/or both directions (e.g. towards the core and/or towards the subscribers), embodiments which do not shape in a given direction may be implemented to drop packets in that direction (e.g. rate limiting).

Figure 6:
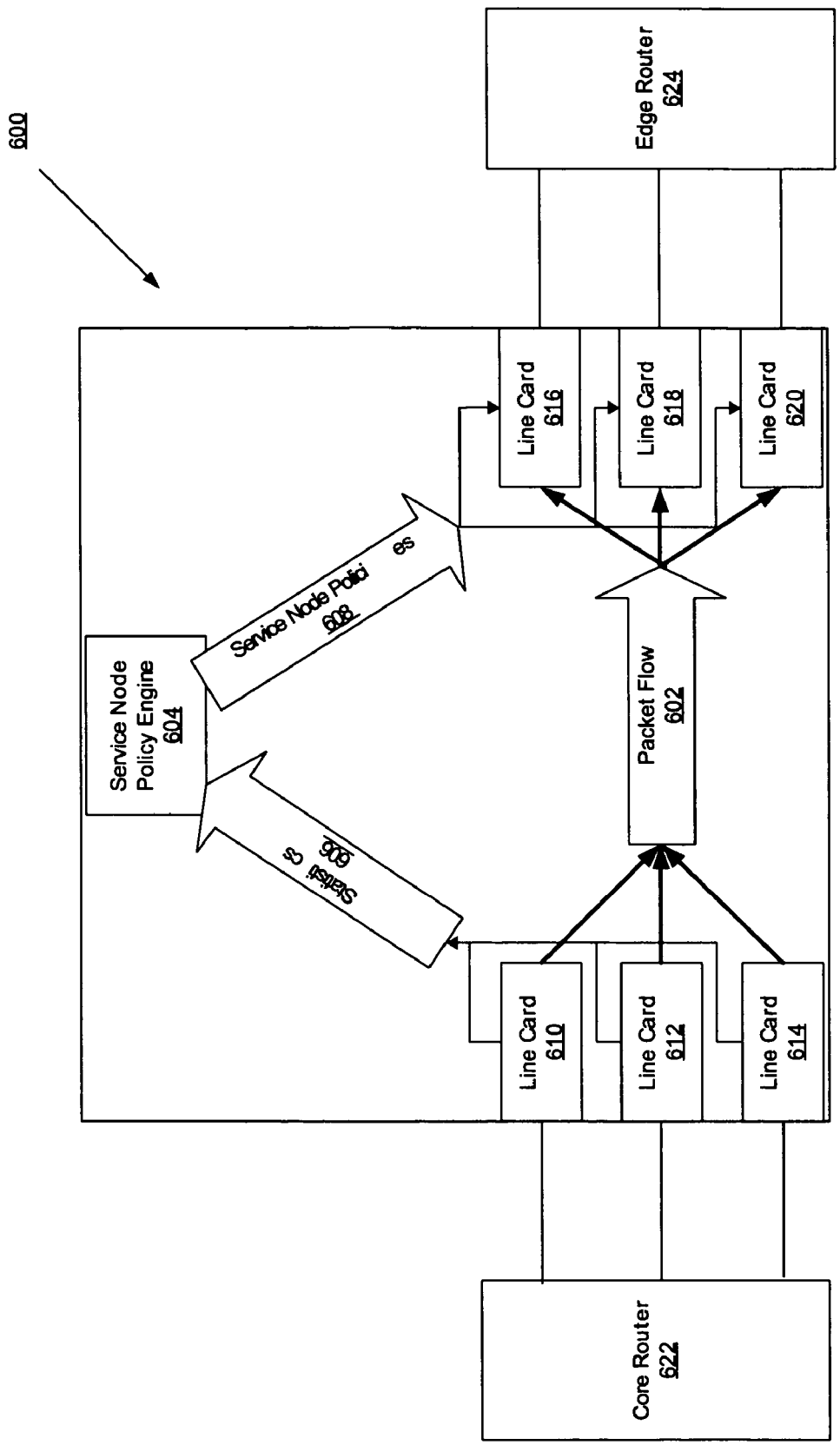
FIG. 6 is an exemplary block diagram illustrating packet flow in the traffic shaping service node according to one embodiment of the invention.

FIG. 6 is an exemplary block diagram illustrating one direction of packet flow in the traffic shaping service node 600 according to one embodiment of the invention. FIG. 6 illustrates an exemplary embodiment of a conceptual traffic shaping service node used to shape traffic described in FIGS. 4 and 5. Although FIG. 6 illustrates a flow of data traffic from core router 622 to edge router 624, alternative embodiments of traffic shaping service node 600 can additionally or alternatively shape data traffic from edge router 624 to core router 622. While in one embodiment, the traffic shaping service node 600 is non-routing, alternate embodiments may include some switching or routing capability (e.g., some simple switching or static routing to support coupling to multiple core and/or edge routers; full edge routing functionality so that flow forwarding decision are made based on dynamic rules to support coupling to multiple core routers and/or directly to devices of the access network typically coupled to edge routers, etc.). In FIG. 6, line cards 610-614 receive data packets from core router 622 over links 626-630. FIG. 6 shows by way of illustration, three ingress line cards and three egress line cards. This is only an example for illustration and other embodiments may have more or less ingress or egress line cards. Alternatively, a single line card can function as both an ingress and egress line card. By way of illustration, line cards 610-614 process the packets by forwarding packets through packet flow 602 to line cards 616-620. In addition to forwarding packets to line cards 616-620, line cards 610-614 generate statistics 606 based on the received packets. Statistics generated may be based on total amount of data traffic, the individual application subscriber data flows, subscriber traffic, etc. In addition, statistics may include duplicates of the received packets. The statistics 606 are forwarded to the traffic policy shaper engine 604. The traffic shaping service node policy engine 604 processes the statistics along with subscriber policies from subscriber policy manager and updates the traffic shaping policies used by line cards 618-620. The traffic shaping service node policy engine 604 sends the updated traffic shaping policies 608 to line cards 616-620. Line cards 616-620 use the updated traffic policies 608 in transmitting packets from packet flow 602 to edge router 624.

Different embodiments use different triggers to update policies. For example, while there are embodiments that use control protocol data triggers and statistical triggers, alternate embodiments may use less, more and/or different triggers. In one embodiment, receiving line cards 610-614 recognize control protocol data for a traffic flow and policy engine 604 updates traffic policies 608 in order to support optimal transmission of the data portion of the traffic flow. For example and by way of illustration, VoIP service initiates VoIP calls by exchanging control protocol between sender and receiving nodes. Once the VoIP call is initiated, VoIP service transmits data representing the actual VoIP call. In this example, line cards 610-614 identify the VoIP control protocols and policy engine 604 updates traffic policies 608 for VoIP data traffic flow transmission. Line cards 616-620 use the updated policy 608 to optimally transmit the data of the VoIP traffic flow.

Regardless of the triggers used, different embodiments install policy updates at different times with respect to the packets that caused the trigger. For example and by way of illustration, if traffic shaping service node 600 receives a video traffic flow on line card 610, line card 610 generates statistics for that video traffic flow. Traffic shaping service node policy engine 604 processes the statistics for this traffic flow, recognizing that this traffic flow requires a certain bandwidth for the video. Policy engine 604 updates the policies for transmitting line card 620 uses to transmit the video traffic flow at the certain bandwidth. Policy engine 604 updates the policy in real-time on line card 620 before line card 620 transmits the video traffic flow. Alternatively, policy engine 604 updates line card 620 after line 620 starts transmitting the video traffic flow. This later model would typically be applied when an associated session control protocol is involved. These protocols are transactional in nature, and can be intercepted before a media stream begins flowing. In both cases, once a media stream flows, the traffic shaping service node 600 typically does not block or cause latency, and shaping policies will be applied either before the flow begins, or as shortly after the flow is detected.

While in one embodiment, packets received on one line card (e.g. line card 610) trigger an updated traffic policy installation on another line card (e.g. line card 620), alternate embodiments may include packets received on one line card that trigger an updated traffic policy installation on that same line card. For example and by way of illustration, control line card data to initiate a VoD session flows from the subscriber in the access network to a VoD system through the core network. Line card 620 receives the VoD control protocol data, which triggers an update for the VoD media flow (e.g. video stream) to line card 620 that transmit the VoD media flow.

While FIG. 6 illustrates one direction of flow (602, 606, & 608), it should be understood that other embodiments may support flow in the reverse (e.g., using different line cards or the same line cards) or simultaneous flow in both directions (e.g., using the same line cards or different line cards). By way of particular example, in one embodiment of the invention line cards 616-620 receive packets from edge router 624, generate statistics and forward the statistics to traffic shaping service node policy engine 604. The traffic shaping service node policy engine 604 generates updated traffic shaping policies to line cards 610-614. Line cards 610-614 use the updated traffic shaping policies when transmitting the packets to the core router. Furthermore, while in one embodiment, line cards 610-614 receives statistical and control protocol data triggers (representing traffic flow from core router 622 to edge router 624), alternate embodiments have other line cards receiving such triggers (e.g., line cards 616-620), or combinations thereof (e.g., receiving triggers at line cards 610-614 and 616-620, etc.).

In addition, while FIG. 6 illustrates statistics generation, policy updates and traffic flow, it should be understood that other embodiments may support statistics generation and policy updates in conjunction with traffic shaping/connection blocking as illustrated in FIGS. 4A-B and 5A-C (e.g. may receive a control packet from subscriber, decide whether to block corresponding connection, and if not block the connection, shape a related traffic flow from the core; may receive a control packet from subscriber, decide whether to block corresponding connection, and if not block the connection, shape a related traffic flow from the subscriber; may shape traffic in one direction, but block connections in both directions; based on control protocol data/statistical triggering events, shape in the same, opposite or both directions; etc.; and/or combinations thereof).

In addition to this traffic shaping mode, a further embodiment of traffic shaping service node 604, has another mode called the passthrough mode. In passthrough mode, traffic shaping service node does no shaping, it just passes the traffic through. That is the packets are transmitted in the same fashion as they are received. The passthrough mode may be used for a variety of reasons, including failures, when traffic shaping service node is overloaded, trouble shooting the network, etc. While traffic shaping service node 602 may apply passthrough mode to traffic flowing in either or both directions it supports, it will be described with reference to one direction. An example of passthrough mode for data flowing between the core (502) and edge (506) router may be illustrated by referring to FIGS. 5B and 5C. In FIG. 5C, the traffic shaping service node 504 transmits packets 520-544 in the same disorderly flow as received in FIG. 5B, instead of transmitting the packets 520-544 in the orderly flow as illustrated in FIG. 5C. Similarly, an example of passthrough mode for data traffic traveling from the edge router 410 to the core router 402 may be illustrated by referring to FIGS. 4A and 4B. Instead of shaping packets 412-442, the traffic shaping service node 406 transmits packets 412-442 in the same disorderly flow as received in FIG. 4B.

Different embodiments of the invention may use different techniques to implement passthrough mode (e.g. ignoring the traffic shaping policies on line cards 616-620, although the traffic policies exist on line cards 616-620; deleting thru traffic policies from line cards 616-620, so no traffic policies exist on the line cards 616-620; etc.)

The traffic shaping service node is inserted at a point in the network where the traffic crosses between the core and access networks. This is advantageous because the traffic shaping service node is in a position to shape traffic associated with services destined for subscribers and apply traffic shaping policies for traffic from subscribers targeted to service providers. An example would be voice or video services offered by a provider for subscribers. A traffic shaping service node situated between the core and access networks allows a traffic shaping service node to shape all the voice and/or video traffic going to or coming from the subscriber. Because voice and video services are bandwidth sensitive and because a network can only handle up to a fixed number of instances of voice and/or video sessions, a traffic shaping service node can guarantee optimal performance for the voice and/or video services for all subscribers. A traffic shaping service node not positioned between core and access network cannot shape all the traffic crossing the core and access networks.

Alternatively, the traffic shaping service node is positioned in the core network and includes routing functionality. For example, the traffic shaping service node can shape and route traffic related to VoD service.

Equivalently, a further embodiment of the traffic shaping service node can be positioned to shape and route traffic from a single or group of subscribers. This traffic shaping service node position may be used for a subscriber (or group of subscribers) that has a great volume or variety of data traffic (e.g. a large corporate subscriber).

Figure 7:
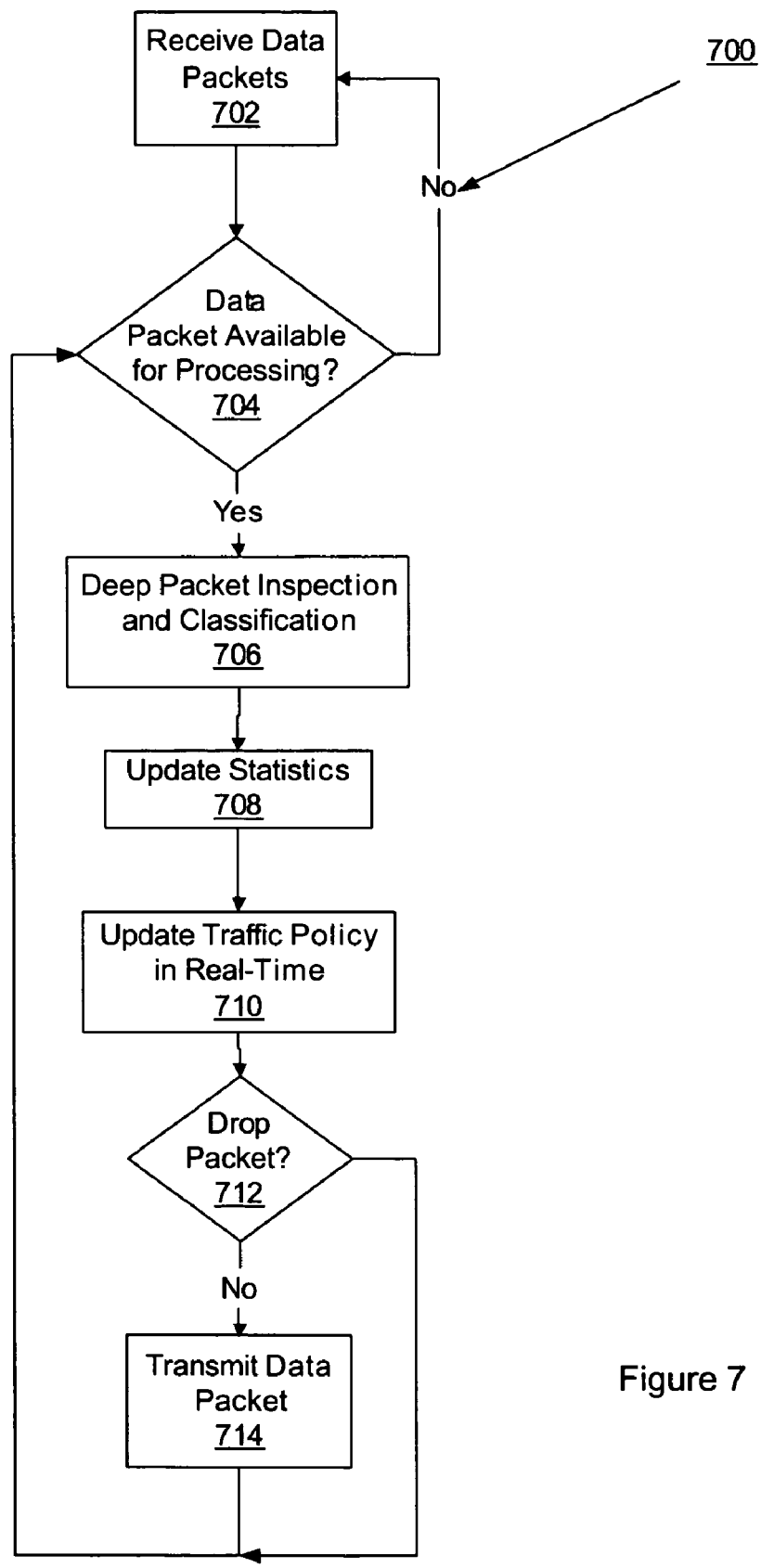
FIG. 7 is an exemplary flow diagram for shaping data traffic according to one embodiment of the invention.

FIG. 7 is an exemplary flow diagram for shaping traffic according to one embodiment of the invention. In FIG. 7, the method 700 receives data packets at block 702. At block 704, method 700 determines if there are any data packets available for processing. If not, method 700 waits to receive data packets at block 702. Otherwise, method 700 performs deep packet inspection and classification on the received packets at block 706. Deep packet inspection and classification is further described in FIG. 8, below. At block 708, method 700 takes the results of the deep packet inspection and updates the statistics. Updating of statistics is further described in FIG. 9, below. At block 710, method 700 uses the statistics and subscribers policies, and updates in real-time the traffic policies used by the line card(s). Real-time updating of the traffic policies is described in FIG. 10, below. Based on the updated traffic policies, the method 700 determines if any of the packets received are dropped at block 712. For those packets being dropped, method 700 drops those packets and returns to block 702 in order to receive (and process) additional data packets. For those packets not being dropped, at block 712, method 700 transmits those data packets according to the updated traffic policies and returns to block 704.

Different embodiments may implement passthrough mode in a variety of ways. In one embodiment of passthrough mode, method 700 executes block 704, but does not perform deep packet inspection and classification. Instead, method 700 jumps down to block 714 to determine transmit. In an alternate embodiment of passthrough mode, method 700 performs deep packet inspection and classification (block 706), but forgoes updating the statistics (block 708) and proceeds directly to block 712 to either drop or transmit the packet. In yet another alternate embodiment of passthrough mode, method 700 updates statistics (block 708), and then proceeds directly to block 714 instead of updating the traffic policy in real-time (block 710). In still another alternative embodiment, method 700 performs blocks 706-712, but when transmitting the data packet in block 714, method 700 transmits without using the traffic policies.

The traffic shaping service node 600 illustrated in FIG. 6 may implement one embodiment of method 700. Line cards 610-620 receives data packets as described in block 702. Although FIG. 6 illustrates line cards 616-620 transmitting data packets, another embodiment has line cards 616-620 receiving data packets. Furthermore, line cards 610-620 determine if there are additional data packets to be received as described in block 704. In addition, line cards perform deep packet inspection and classification as described in block 706. An alternate embodiment has the traffic shaping service node policy engine 604 performing deep packet inspection (block 706). In a still further embodiment, parts of the deep packet inspection method (block 706) are performed on both line cards 610-620 and the traffic shaping service node policy engine 604.

As illustrated in FIG. 6, statistics are generated by line card 610-614 and processed by the traffic shaping service node policy engine 604. Although line cards 616-620 are illustrated as not generating statistics 606, line cards 616-620 can similarly generate statistics 606 based on the packets received on line cards 616-620. Thus, both line cards 610-620 and traffic shaping service node policy engine 604 update the statistics as described in block 708. Similarly, both line cards 610-620 and traffic shaping service node policy engine 604 update the traffic policy in real-time as described in block 710. In this embodiment, the traffic shaping service node policy engine updates the current traffic policy and sends the updated traffic policies to line cards 610-620. Although line cards 610-614 are illustrated as not receiving the updated traffic shaping policies 608, an alternate embodiment of block 710 has line cards 610-614 receiving the updated traffic policies 608 from the traffic shaping service node policy engine 604.

Finally, based on the updated traffic policies 608, line cards 610-620 determine whether to drop (block 712) or transmit the packet according to the traffic shaping policies (block 714). Although line cards 610-614 are not illustrated in FIG. 6 as transmitting the packets, an alternate embodiment of FIG. 6 has line cards 610-614 transmitting packet according to traffic shaping policies 608.

Figure 8:
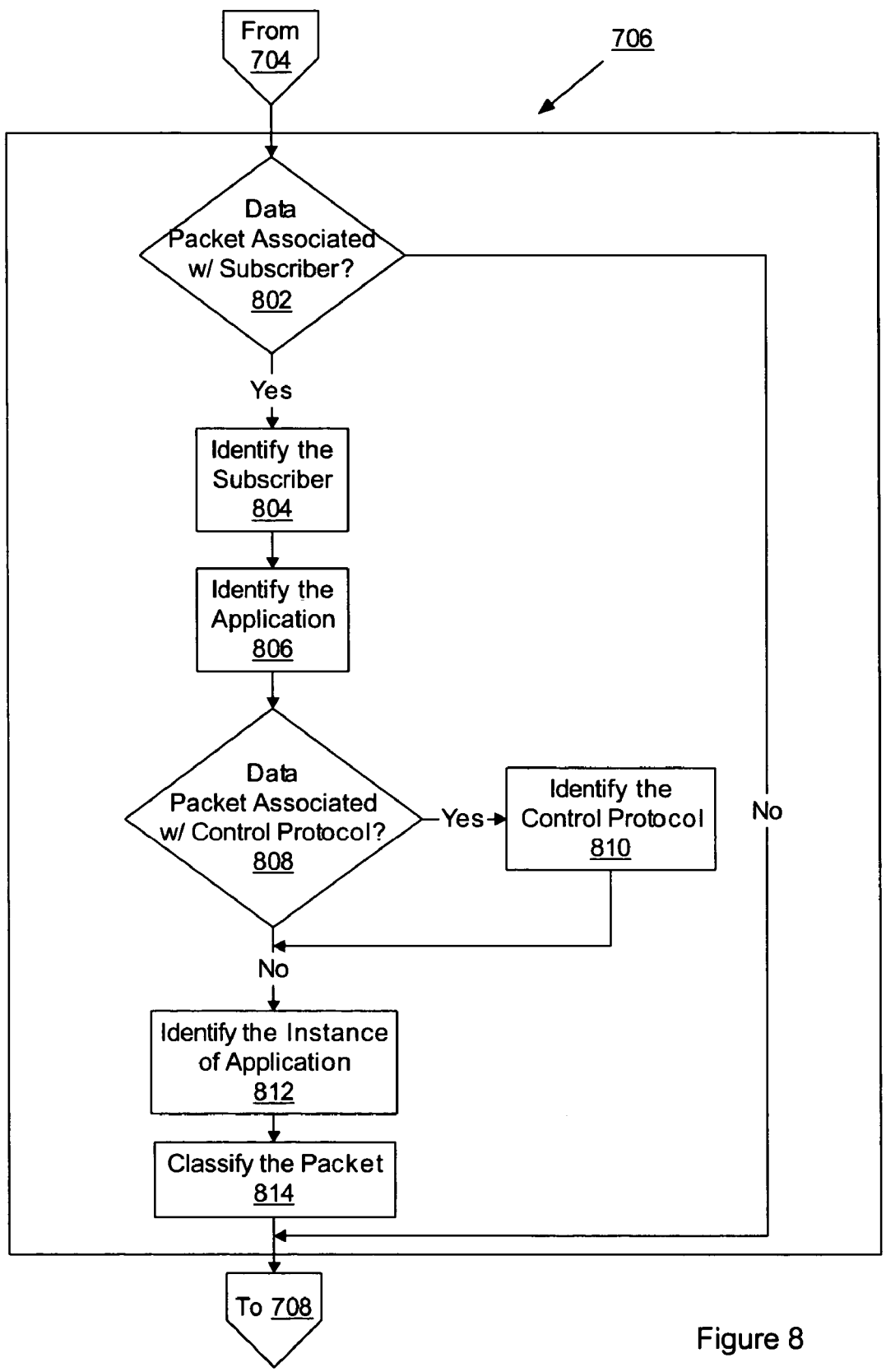
FIG. 8 is an exemplary flow diagram for deep packet inspection and classification according to one embodiment of the invention.

FIG. 8 is an exemplary flow diagram for deep packet inspection and classification ("deep packet inspection method" 706) according to one embodiment of the invention. Thus, FIG. 8 illustrates an example of what deep packet inspection and classification can be implemented to accomplish. Of course, alternative embodiments of the invention could implement the deep packet inspection method to do more, less and/or different types of operations.

Figure 2:
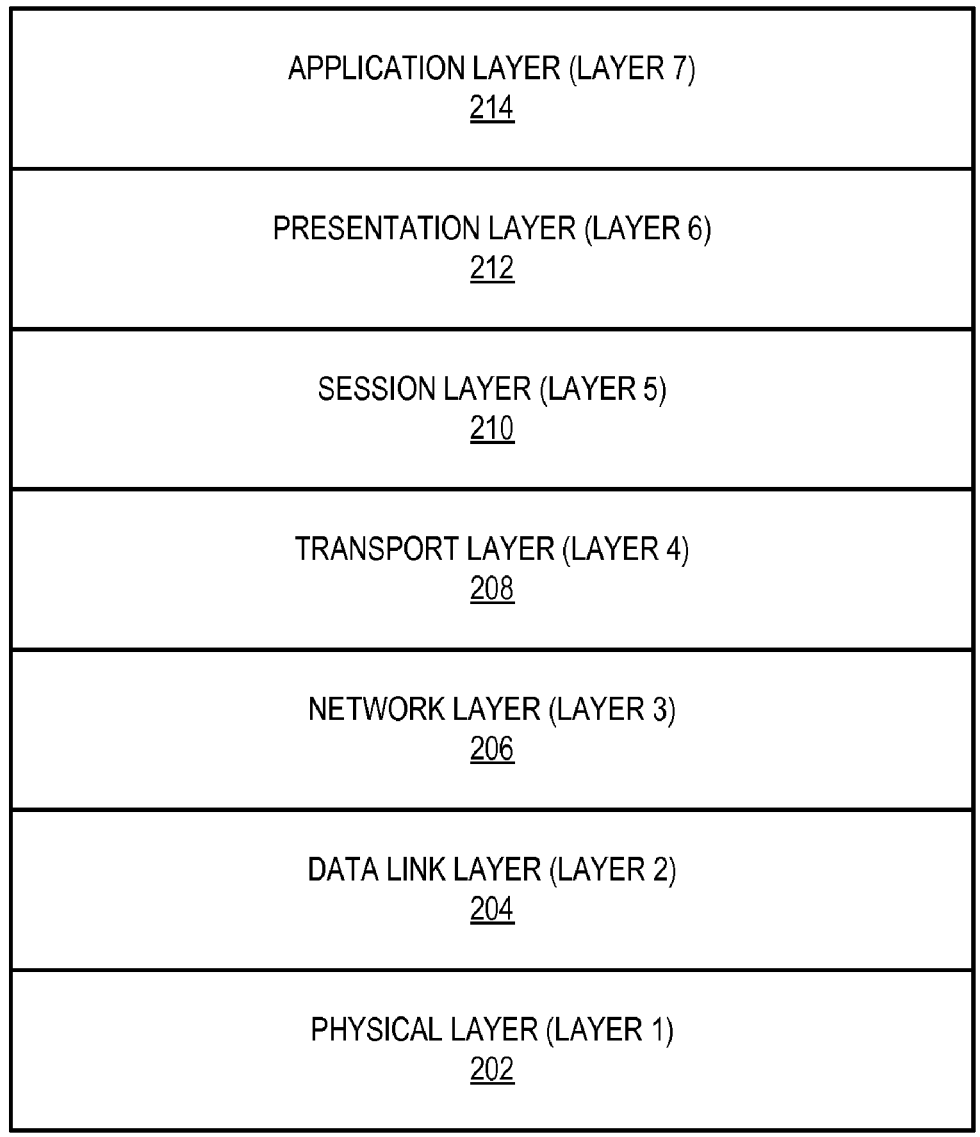
FIG. 2 (Prior Art) is a block diagram illustrating layers of the OSI protocol stack.

In block 802, the deep packet inspection method 706 determines if the packet is associated with a subscriber. Different embodiments of the method 706 may use one or more ways to associate packets with a subscriber. For example, identifying the subscriber may be accomplished by associating the source (and possibly destination) address contained in the packet with the subscriber. For a packet based on the OSI model (FIG. 2), the source or destination address is determined by interrogating the network layer header 206 of the packet. As another example, the subscriber may be associated with a circuit identified in the data link layer (204) of the packet (e.g., circuit information could be in Asynchronous Transfer Mode (ATM) circuits, using virtual path identification (VPI)

and/or virtual circuit information (VCI) identifiers; circuit information may be a PPPoE identifier, such as an subscriber and a domain name, etc.). As another example, subscriber information may be contained in the application layer 214. Still further methods may be employed to identify the subscriber from the data packet depending on the nature of the packet.

If the packet is associated with a subscriber, at block 804, the subscriber associated with the packet is identified. Otherwise, the method 706 skips deep packet inspection and proceeds to block 708.

Returning to FIG. 8, from block 804, control passes to block 806. In block 806, deep packet inspection method 706 identifies the application associated with the packet. Block 806 can be implanted any number of ways (or combinations thereof), including those currently known and/or those future developed. By way of illustration, and not by limitation, several will be described. For example, the deep packet inspection method may examine the application layer 214 of the packet. Specifically, the method examines the structure of the data stored in the application layer 214 to determine which application sent or uses this packet. For example, a packet containing several frames of video could indicate the packet is for a VoD application. As another example, deep packet inspection method 706 may interrogate the transport layer header 208 to determine the source or destination port of the packet. Many applications use a well-known port to send or receive the packet. For example, a packet with a source or destination port of 80 is usually associated with web page retrieval. As another example, the deep packet inspection may determine if the source and/or destination address is associated with a particular application. For example, the packet may be associated with a well-known application server located in the core network.

From block 806, control passes to block 808. At block 808, deep packet inspection method 706 determines if the packet contains control protocol data in the application layer 214. An application control protocol is a protocol used to control network functions of an application. For example, Session Initiation Protocol (SIP) is used to set up VoIP calls and video conferencing. If the data packet contains control protocol data, the deep inspection method identifies the control protocol at block 810.

In either case, deep inspection method 706 determines the instance of the application at block 812. An instance of an application means the number of concurrent application session flowing through the traffic shaping service node. A session is defined as a lasting connection between a user and a peer, where a peer can be a client or a server. A session may be maintained in different levels (e.g., a session may be maintained at the transport layer (for example, Transmission Control Protocol (TCP)) (FIG. 2, 206), a session may be maintained by a higher-level program using a method defined in the data packet being exchanged, etc.). In one embodiment of the deep packet inspection method 706, concurrent application sessions are derived from the application subscriber traffic flows currently moving through the traffic shaping service node. For example, the traffic shaping service node could determine the number of concurrent VoD sessions passing through the traffic shaping service node at any given instance in time. In another embodiment, the number of concurrent application sessions is determined from the application subscriber flows that are currently flowing through the traffic shaping service node or have flowed within a specified time window. This embodiment is used when an application has natural gaps in the data traffic flow, for example, pauses of silence in a VoIP call.

From block 812, control passes to block 814. At block 814, the deep packet inspection method classifies the packet based on the subscriber, application, instance of application and whether the packet contains control protocol data. The classification of each packet is used to organize the packets into application subscriber traffic flows and in determining what traffic policy is used when transmitting the packet. From block 814, control passes to block 708.

Figure 9:
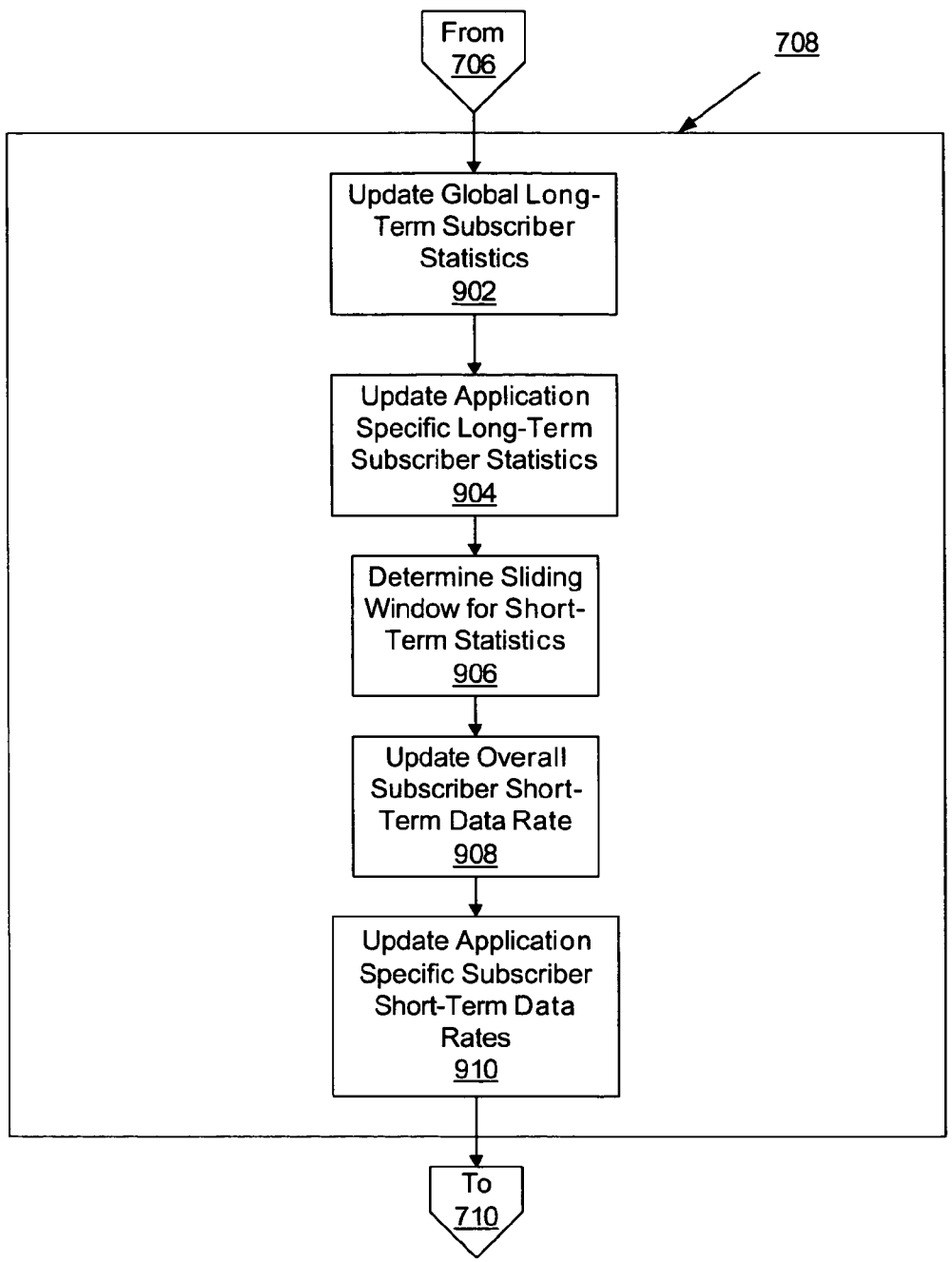
FIG. 9 is an exemplary flow diagram for updating statistics according to one embodiment of the invention.

FIG. 9 is an exemplary flow diagram for updating statistics ("statistics method" 710) according to one embodiment of the invention. Thus, FIG. 9 illustrates an example of updating statistics from FIG. 7, block 708. Of course, alternative embodiments of the invention could implement the traffic policy method to do more, less and/or different types of operations.

At block 902, the statistics method updates global long terms statistics. These statistics are, but not limited to, the overall packets sent or received by the subscriber. For example, the statistics method may keep track of the total number of packets sent and received by the subscriber. In addition, the statistics method may keep track of the total number of bytes sent and received by the subscriber. Furthermore, the statistics method may collect the total number of packets and bytes sent or received by the traffic shaping service node. From block 902, control passes to block 904.

At block 904, the statistics method 708 updates the long-term application specific subscriber statistics. In one embodiment of the invention, these statistics are the number of bytes and packets sent or received on a per application, per subscriber basis. For example, the statistics method 708 may separately track the number of bytes and packets sent for web, VoIP and VoD traffic. These statistics may be used for billing purposes and/or updating traffic policy. From block 904, control passes to block 906.

At block 906, the statistics method 708 determines the sliding window used for short-term statistics. The statistics method 708 uses the window to calculate statistics based on given time period. For example, statistics method may calculate a subscriber's overall bandwidth and application traffic flow bandwidth over a one-minute period. From block 906, control passes to block 908.

The statistics method 708 updates overall subscriber short-term (block 908) and application specific subscriber data rates (block 910). For example, for a given moment in time, the subscriber's overall data rate is 5.0 Mbps, where 3.0 Mbps is for VoD, 128 kbps for two VoIP calls and the rest for web downloads. From block 910, control passes to block 710.

Figure 10:
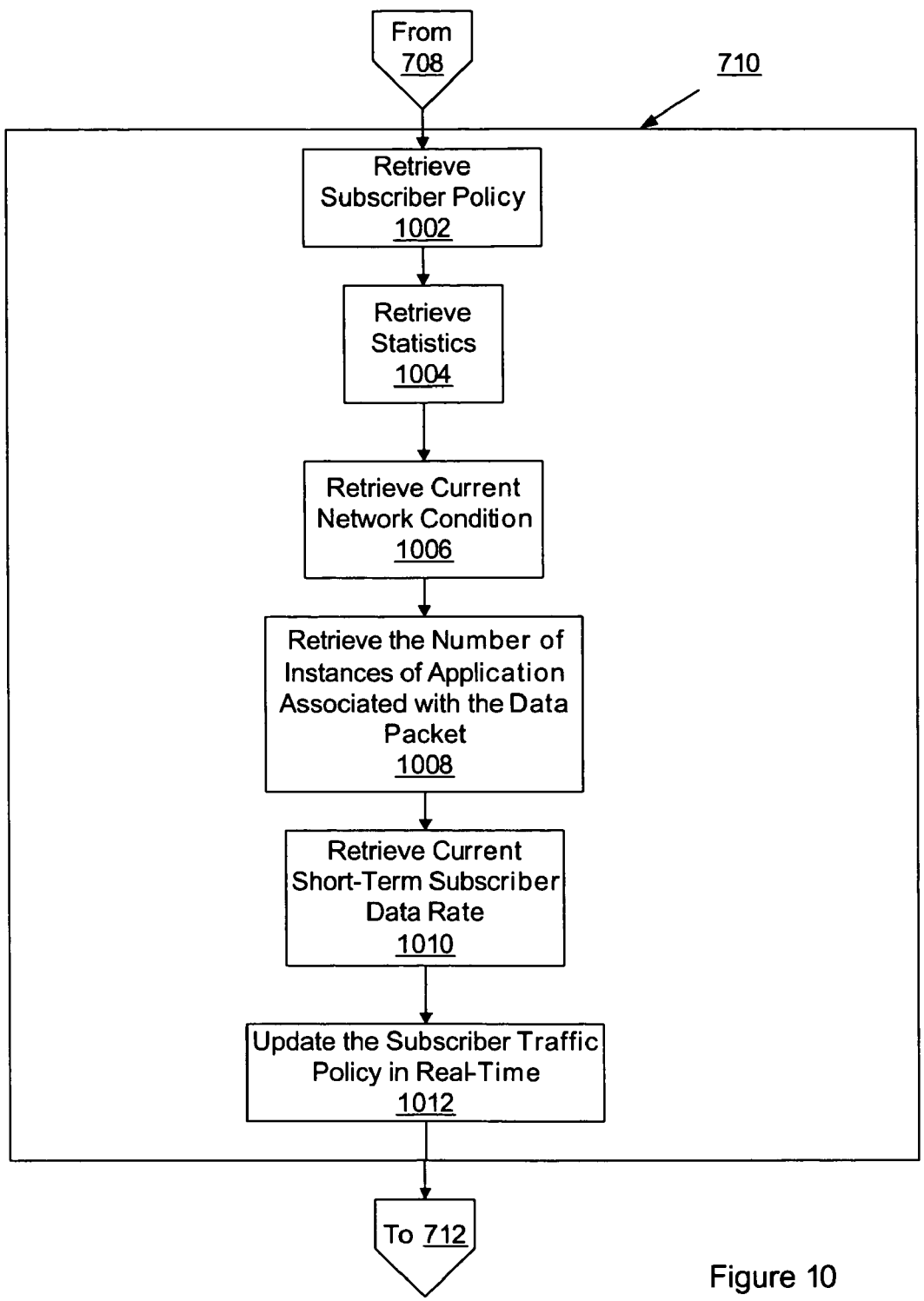
FIG. 10 is an exemplary flow diagram for updating traffic policy in real-time according to one embodiment of the invention.

FIG. 10 is an exemplary flow diagram for updating traffic policy ("traffic policy method" 712) in real-time according to one embodiment of the invention. Thus, FIG. 10 illustrates an example of updating traffic policy in real-time from FIG. 7, block 710. Of course, alternative embodiments of the invention could implement the traffic policy method to do more, less and/or different types of operations.

At block 1002, the traffic policy method retrieves the subscriber policy. In one embodiment, the subscriber policy is stored locally. In another embodiment, the subscriber policy is stored remotely and the traffic policy retrieves the remotely stored subscriber policy. For example, the subscriber policy is stored in a Remote Authentication Dial In User Service (RADIUS) database. From block 1002, control passes to block 1004.

At block 1004, the traffic policy method retrieves statistics from entities generating or storing the statistics. In one embodiment, as illustrated in FIG. 6, the statistics are retrieved from line cards 610-620. Although FIG. 6 does not illustrate line cards 616-620 generating statistics, line cards 616-620 can generate the statistics as well. The retrieved statistics may be subscriber specific, global statistics or both. Returning to FIG. 10, from block 1004, control passes to block 1006.

At block 1006, the traffic policy method retrieves the current network condition. The network condition is a snapshot of the amount of traffic flowing through the traffic shaping service node. In one embodiment, the network condition is stored with the overall statistics. In addition, network statistics may be stored on a, but not limited to, per port, per circuit, per individual host address, and/or per subnetwork address basis (e.g., IP address with a network or prefix). From block 1006, control passes to block 1008.

At block 1008, the traffic policy method retrieves the number of application instances flowing through the box. In one embodiment, the number of application instances is the number of applications presently flowing through the traffic shaping service node. In another embodiment, the number of application instances is determined over a window of time. From block 1008, control passes to block 1010.

At block 1010, the traffic policy method retrieves the current short-term subscriber data rate. In one embodiment the data rate is the overall subscriber data rate. In another embodiment, the data rate comprises application specific subscriber data rates. From block 1012, control passes to block 712.

Using current subscriber policy, the statistics, current network condition and the subscriber's data rate, the traffic policy method updates the subscriber policy at block 1012. Referring back to FIG. 6 and its associated description, subscriber's policy are one of the traffic policies sent to line cards 616-620 from traffic shaping service node policy engine 604. A subscriber policy may consist of, but is not limited to (a) an overall rate limit on the subscriber's traffic, (b) permanently changing bandwidth limits for a particular application, (c) temporarily increasing or decreasing bandwidth limits for a particular application or (d) restricting or allowing instantaneous bandwidth based on a long-term data packet throughput.

Figure 11:
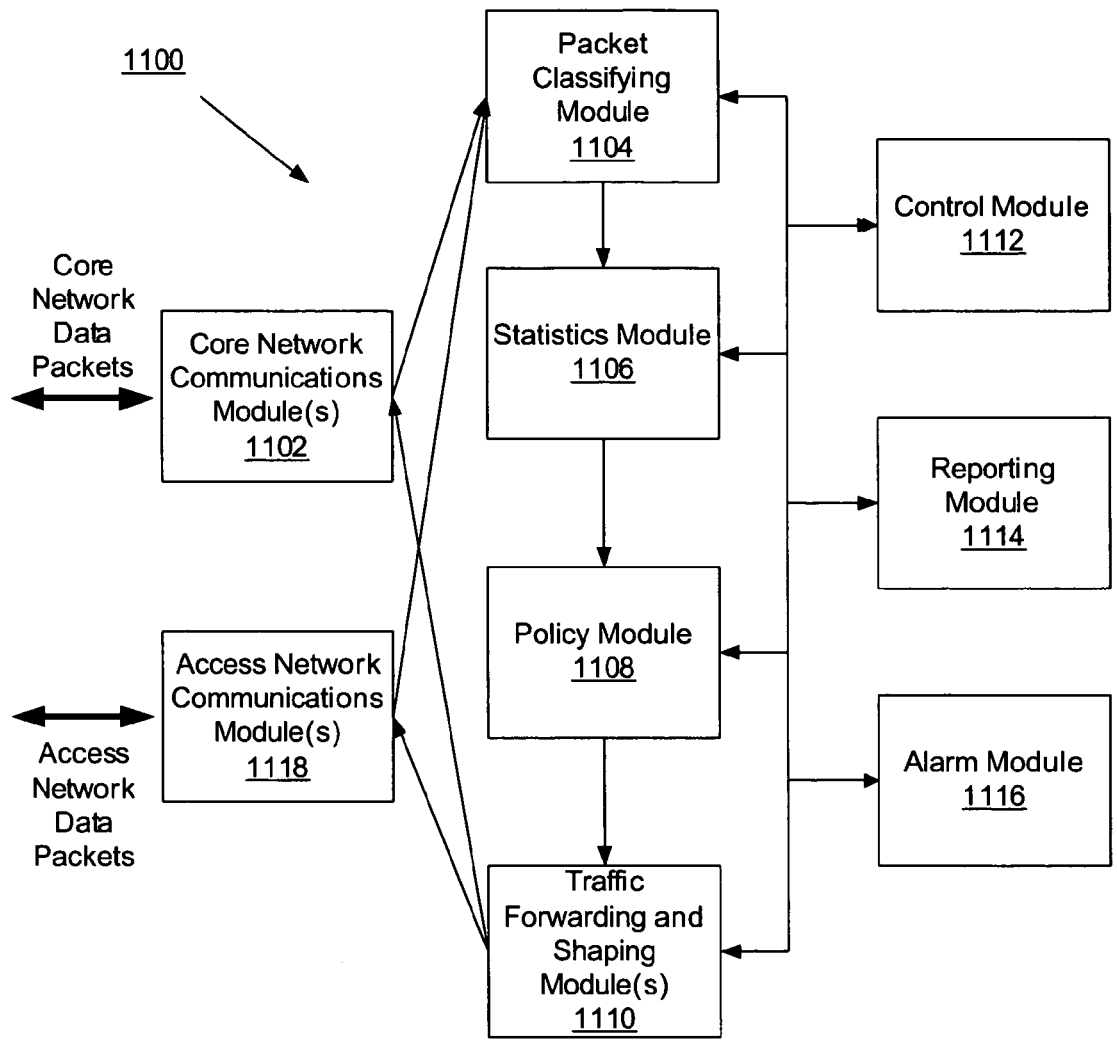
FIG. 11 is a block diagram illustrating of a traffic shaping service node according to one embodiment of the invention.

FIG. 11 is a block diagram illustrating a different representation of a traffic shaping service node 1100 according to one embodiment of the invention. Traffic shaping service node 1100 communicates with the core and access networks via core network communications module(s) 1102 (e.g., line cards) and access network communications module(s) 1118 (e.g., on the line cards), respectively. Data packets received on communications module(s) 1102 and 1118 are inspected and classified through deep packet inspection by packet classifying module 1104. One embodiment of the packet classifying module 1104 resides in the line cards, whereas another embodiment of the packet classifying module 1104 resides in the traffic shaping policy engine. Alternatively, functionality of the packet classifying module can be divided among one or more line cards and/or the traffic shaping policy engine. Results of the deep packet inspection from packet classifying module 1104 are fed into statistics module 1106. Statistics module 1106 generates statistics on, but not limited to, overall network traffic, subscriber traffic, and application traffic. Similar to the packet classifying module 1104, the statistics module can reside on the line card, the traffic shaping policy engine, or combinations of the line and/or the traffic shaping policy engine. Policy module 1108 uses results from the statistics module 1106 and updates both subscriber and overall traffic policies. In an exemplary embodiment, policy module 1108 resides in the processor card. Updated traffic policies are fed to traffic monitor module 1110.

Data packets from packet classifying module are forwarded to traffic forwarding and shaping module 1110. Traffic forwarding and shaping module 1110 forwards data packets using the updated traffic policies to either core network 1102 or access network 1118 communications module(s), depending on the destination of data packet. In an exemplary embodiment, traffic forward and shaping module 1110 resides in a line card.

Control module 1112 configures and controls packet classifying module 1104, statistics module 1106, policy module 1108, traffic monitor module 1110, communications modules 1102 and 1118, reporting module 1114 and alarm module 1116. In one embodiment, control module 1112 comprises a graphical user interface (GUI) used to configure and control the other modules. Alternatively, control module 1112 is a command-line interface or simple network management protocol (SNMP) agent. In an exemplary embodiment, control module 1110 resides in a processor card.

Reporting module 1114 generates system reports based on the traffic flow through the traffic shaping service node 1100. In an exemplary embodiment, reporting module 1114 resides in a processor card. Finally, the alarm module 1116 generates and sends alarms alerting operators to problems with the traffic shaping service node 1100. In an exemplary embodiment, alarm module 1116 resides in a processor card.

Exemplary Traffic Shaping Service Node Architecture

FIGS. 2-11 detail a traffic shaping service node used to shape network data traffic between a core and access network. A hardware architecture embodiment of the traffic shaping service node, as illustrated in FIGS. 2-11, requires sufficient hardware resource to inspect, classify, shape and transmit the potentially millions of packets per second flowing between the core and access networks. Conceivably, one embodiment of the traffic shaping service node may be as simple as a device comprising of a central processing unit (CPU) and two network interfaces. However, this embodiment requires a very large amount of processing power in one CPU to inspect, classify, shape and transmit millions of packets per second. This capability is currently beyond state of the art for CPUs, whether general purpose CPU or CPUs specialized for network processing. An embodiment of the traffic shaping service node comprising multiple CPUs would be better able to handle the high flow of network data traffic between the core and access networks. Furthermore, the traffic shaping service node should comprise of more than two network interfaces so as to handle one core network communicating with multiple access networks and have multiple network connections between the traffic shaping service node and a single core or access network.

FIGS. 12-16 illustrate exemplary network device architectures that may be used for a variety of purposes, including but not limited to, a traffic shaping service node as previously described. Thus, while for exemplary network device architectures described with reference to FIGS. 12-16 are described with reference to a traffic shaping service node, it should be understood that these architectures are independent as part of the invention.

Figure 12:
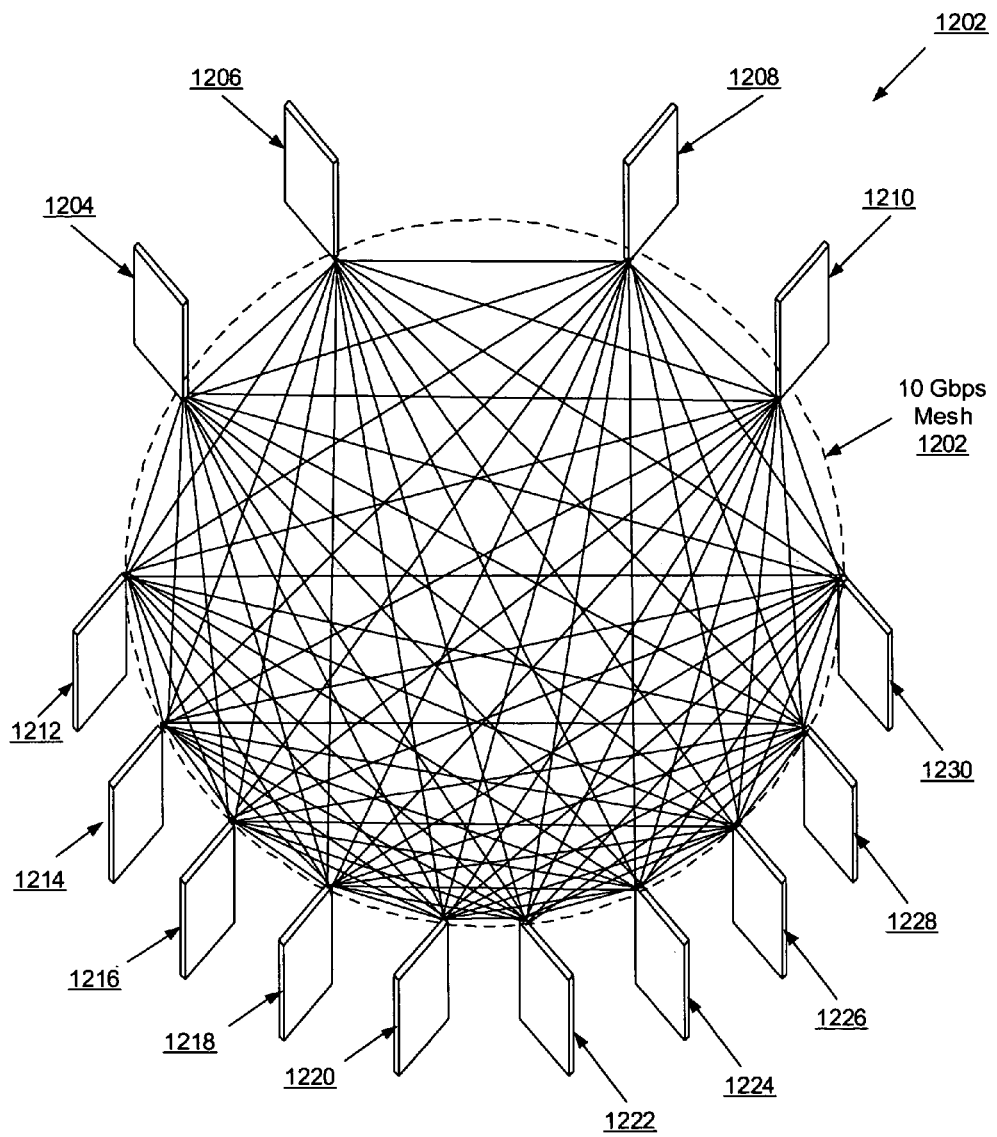
FIG. 12 is a block diagram illustrating a mesh backplane used in the traffic shaping service node according to one embodiment of the invention.
Figure 13:
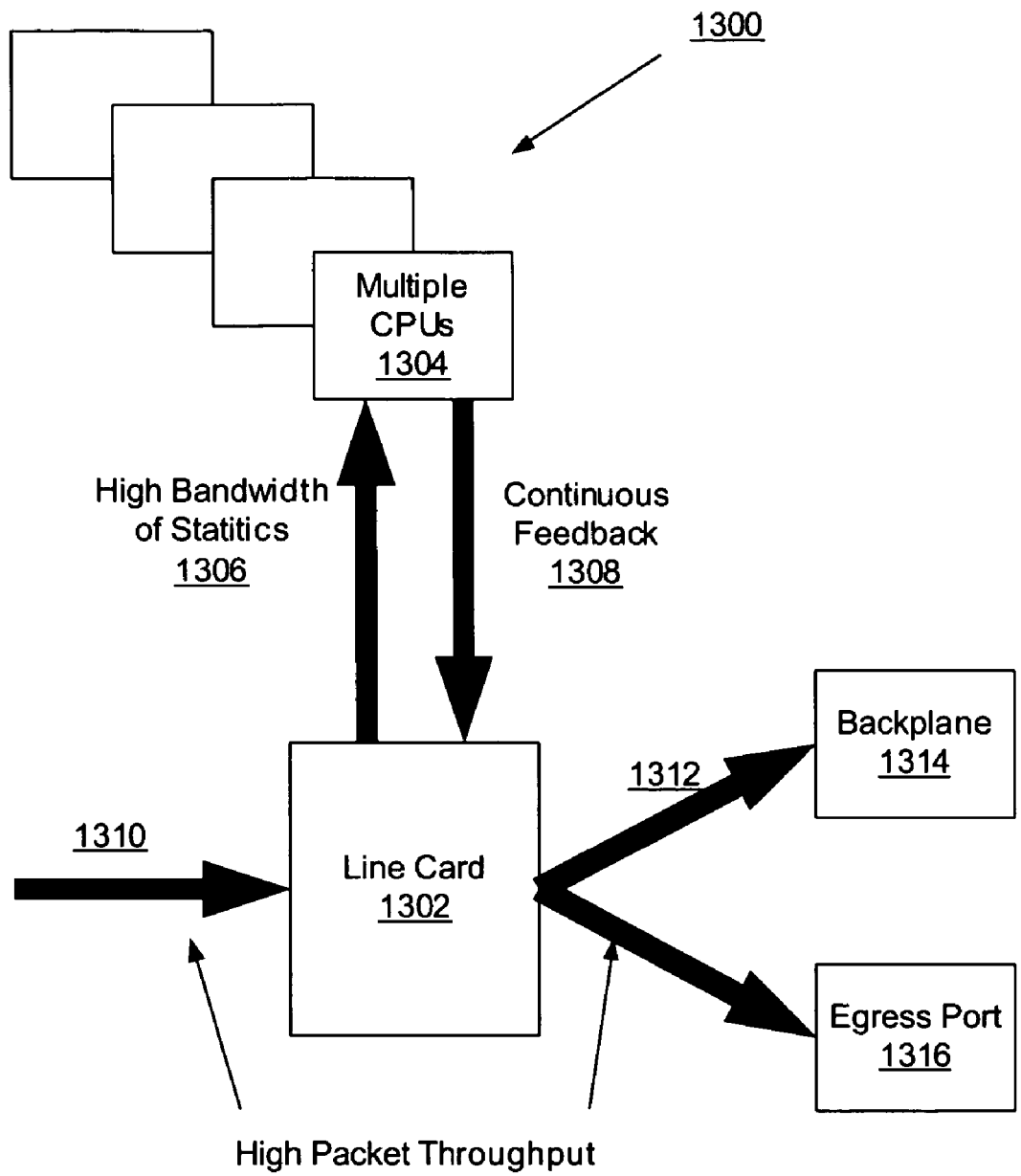
FIG. 13 is a block diagram illustrating communication between a line and multiple CPUs according to one embodiment of the invention.

FIG. 12 is a block diagram illustrating a mesh backplane used in the traffic shaping service node according to one embodiment of the invention. In FIG. 12, a number of processor cards 1204-1210 are communicatively coupled to line cards 1212-1230 through a mesh of 10 Gbps backplane links coupling each processor card-processor card, line card-line card and processor card-line card pair with an aggregate bandwidth of 230 Gbps. A 10 Gbps connection between each pair of cards allows a large volume of data traffic and communication between the processor and line cards. The data traffic flowing between each pair of line cards and each pair of processor-line cards is illustrated in FIG. 13, below. In addition to processor card-line card connectivity, processor card-processor card connections enable the coordination of high speed communications between compute resources. In addition, it allows for different ratios of processor cards to line cards since each slot is connected to every other slot. For example and by way of illustration, data traffic flows between the processor cards can be, but not limited to, statistics data, policy provisioning, routing information, etc.

Furthermore, the use of a mesh backplane as illustrated in FIG. 12, allows for a failover mode in the traffic shaping service node. For example, in one embodiment, consider a scenario where data packets are flowing from line card 1212 to line card 1214 while processor card 1206 updates line card 1214 with traffic policies. If line card 1214 should fail, the system can automatically switch the flow of data packets from line card 1212 to line card 1216 and update the traffic policies from 1206 to line card 1216. This allows for different configurations in which the number of line cards use the number of processor cards can be adjusted to meet application requirements. In addition, in another embodiment, mesh backplane 1202 allows for failover of a processor card. For example and by way of illustration, in this embodiment, functionality and state of processor 1206 is running on backup processor 1208. This means that processor card 1208 is ready to take over in the event processor card 1206 fails. If processor card 1206 fails, processor card 1208 assumed processing formerly performed by processor card 1206.

An alternative embodiment of the traffic shaping service node can use a backplane that is not a mesh backplane. For example, line cards 1212-1230 and processor cards 1204-1210 may communicate via a bus architecture, where each card 1204-1230 connects to a single high-throughput bus. Alternatively, traffic shaping service node can use any high speed backplane configuration known in the art (e.g. dual-star, etc.) and/or developed in the future.

FIG. 13 is a block diagram of an architecture 1300 illustrating communication between a line card and multiple processors according to one embodiment of the invention. In FIG. 13, a line card 1302 is communicatively coupled to multiple processors 1304 via a 10 Gbps connection. Alternate embodiments may have slower or faster speed connections. As the line card 1302 receives the data packet on an ingress port 1310, line card 1302 processes the data packets by sending a high bandwidth of statistics 1306 to the multiple processors 1304. In addition, the line card 1302 sends received data packets to either the back plane 1314 to get to another line card 1316 for transmission or transmits the packets out one of the egress ports.

Furthermore, in FIG. 13, the multiple processors 1304 process the high bandwidth of statistics 1306. In one embodiment, the multiple processors 1304 are contained in one processor card. In an alternate embodiment, the multiple processors are contained in multiple processor cards. After processing the statistics the multiple processors 1304 send continuous feedback 1308 to the line card 1302. In one embodiment, the continuous feedback 1308 updates traffic policies for the network condition as a whole and not particular to a subscriber. For example, the multiple CPUs 1304 determine that the amount of data traffic flowing to the access network is higher than the access network can handle. In this embodiment, the traffic policy scales back all data traffic headed for the access network. In another embodiment, the continuous feedback updates traffic policy for all subscribers. An example of this type of traffic policy update would be if a new service is added or modified that results in new bandwidth for the service. For example, a service provider adds a new VoD service requiring 3.5 Mbps for each VoD session (i.e. each VoD application subscriber traffic flow). The multiple processors 1304 push down the traffic policy via the continuous feedback 1308 for the VoD service to the line card 1302.

In a still further embodiment, the continuous feedback 1308 updates traffic policy for one subscriber. In one embodiment of the updated traffic policy, a subscriber's traffic is at too high a rate to comply with the subscriber's monthly data packet throughput. Thus, the updated traffic policy dials down nonessential data traffic (e.g. web traffic, file transfer, etc.) to a rate that would be better in line with the subscriber's monthly data packet throughput. In example above, the continuous feedback 1308 is used to update the traffic policy in real-time. By the multiple processors 1304 continually updating the line card 1302 with latest traffic policies on a per subscriber, per application or network-wide basis, line card 1302 gives greater control over the data traffic currently flowing through the network.

An advantage of architecture 1300 is that there is a large amount of processing power compared with the communication throughput. For example, if comparing one exemplary line and processor card as described in FIGS. 15 and 16, (and using the Broadcom 1480 CPU as an exemplary CPU that has an 12,000 millions of instructions per second (MIPS) rating) there are up to 48,000 MIPS per 10 Gpbs of communications throughput. Another metric is the number of MIPS per 1 Gbps network throughput available in architecture 1300. In one embodiment, assuming two processors cards supporting ten line cards, architecture 1300 has 96,000 Dhrystone MIPS for 100 Gbps of network throughput, or 960 Dhrystone MIPS per 1 Gbps. This high amount of processing power enables architecture 1300 to process a high amount of statistics. Furthermore, architecture 1300 is built to withstand a "packet storm" state. A packet storm is a high volume of packets, statistics or other information being processed within a network device. Usually, a packet storm is a volume of packets, statistics or information that is too great for a network device and results in a shutdown or degradation of performance of the network device. However, architecture 1300 is designed to handle this high volume through the use of a high level of processing power coupled with a high speed mesh backplane.

Furthermore, an exemplary embodiment of architecture 1300 is specialized for traffic shaping and not routing. In this embodiment, packet routing decision are made by devices other than architecture 1300, thus allowing for a highly specialized device than can handle the high volume of packets, statistics and other information. Alternative embodiments of architecture 1300 add routing decisions to architecture 1300.

Figure 14:
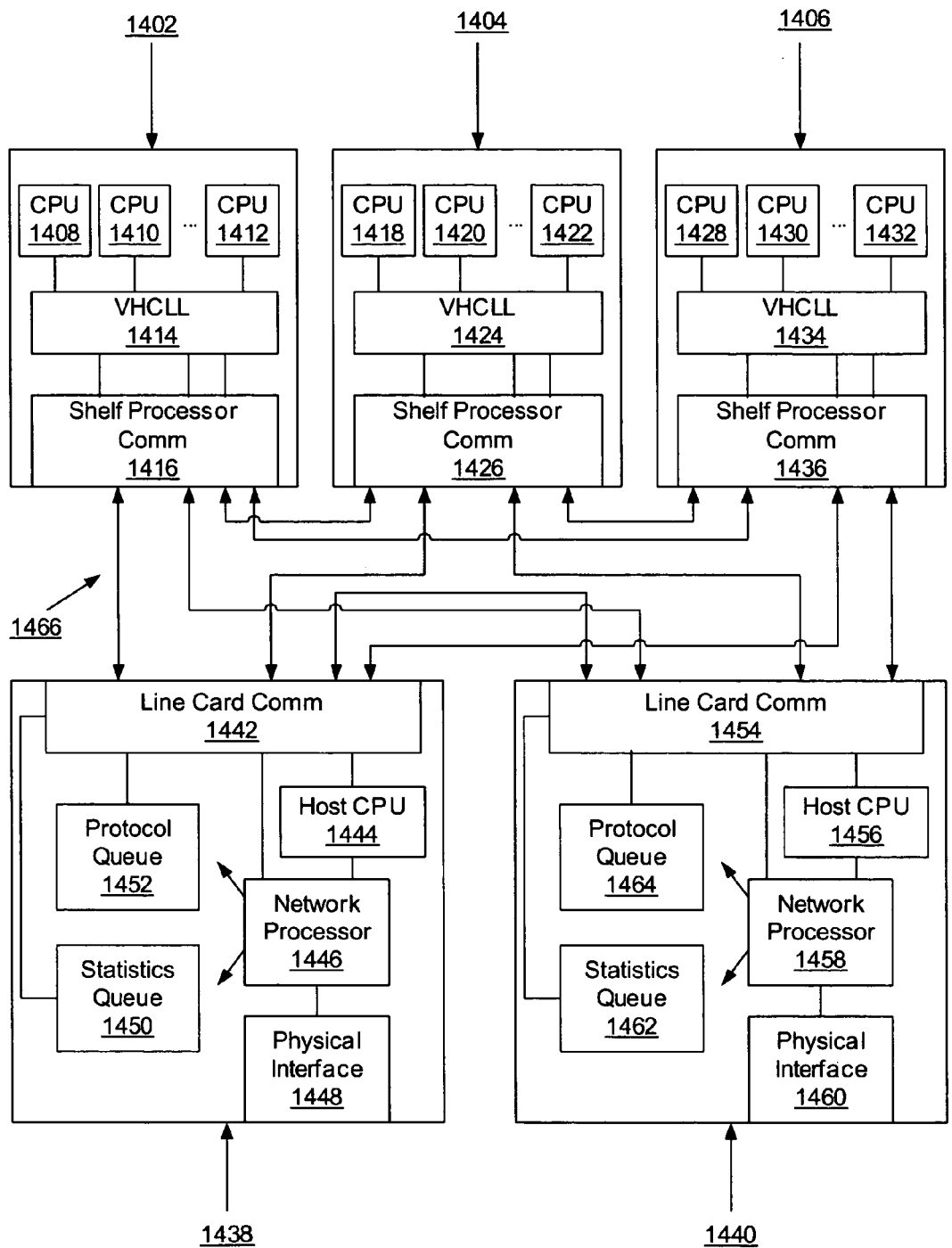
FIG. 14 is a block diagram illustrating connections between line cards and processor card according to one embodiment of the invention.

FIG. 14 is a block diagram illustrating an architecture 1400 of line and processor cards including processor-line card connections, according to one embodiment of the invention. FIG. 14 illustrates architectural detail represented by FIG. 13. The architecture 1400 presented shows processor cards 1402-1406 connected to line cards 1438 and 1440 through a 10 Gbps backplane mesh 1466. As illustrated in FIG. 12, every card connects to every other card with a 10 Gbps connection. Alternate embodiments may have faster or slower speed connections. Although only three processor cards 1402-1406 and two line cards 1438 and 1440 are illustrated, the architecture 1400 presented can scale to any number of processor and line cards. Furthermore, the architecture 1400 presented can accommodate any mix of processor and line cards, although an optimal mix is two or three line cards for every one processor card. An exemplary embodiment of architecture 1400 has four processor cards and ten line cards.

In FIG. 14, processor card 1402 comprises multiple CPUs 1408-1412 connected to shelf processor communication connector 1416 through a VHCLL bus 1414. In one embodiment, processor card 1402 has four CPUs, although other embodiments can have more or less CPUs. The VHCLL bus 1414 on processor card 1402 provides a relatively high speed connection (e.g., 20 Gbps) between the backplane and the CPUs. This allows the CPUs to process and communicate at a full 10 Gbps bandwidth of data with both line cards 1438-1440 and processor cards 1404-1408 concurrently. Processor cards 1404 and 1406 have similar architecture to processor card 1402.

The line card 1430 illustrated in FIG. 14 further comprises line card communication connection 1442 to the backplane mesh 1466. Network processor 1446 and host CPU 1444 connect to the line card communication connection as well as protocol queue 1452 and statistics 1450 queue. Physical interface 1448 connects with network processor 1448. In one embodiment, the physical interface 1448 is an optical port and may be one of OC-192, OC-48, fiber-based GigE, fiber-based 10 GigE etc. In another embodiment, the physical interface is an electrical port, such as a copper-based GigE or 10/100 Ethernet port. In still a further embodiment, the physical interface is a wireless transceiver and may be radio transceiver based on protocols 802.11a, 802.11b/g and 802.16 (WiMAX). Alternatively, the wireless physical interface 1448 could be infrared port. In the three embodiments mentioned, the physical interface 1448 can comprise of one or more of optical, electrical or wireless ports. In an exemplary embodiment, physical interface 1448 comprises one OC-192, four OC48, one 10 GigE or ten GigE ports. Line card 1440 has the same architecture as line card 1438.

In FIG. 14, line card 1438 receives data packets through the physical interface 1448. The network processor 1446 processes the packets by deep packet inspection. The network processor 1446 passes the packet on to the line card communication connection 1442. Furthermore, network processor provides the results of the deep packet inspection to the statistics queue 1450 and protocol queue 1452. Statistics queue 1450 and protocol queue 1452 each feed their respective data to the line card communication connection 1442. The line card communication connection 1442 puts the statistics and protocol data onto the backplane mesh 1466 in order for the data to be forwarded to one of the processor line cards 1402-1406. Processor cards 1402-1406 process the statistics and protocol data.

In addition, the line card communications connection 1442 puts the data packet on to the backplane mesh and forwards the data packet to line card 1440. However, it is understood line card communications connection 1442 can possibly forward packets to any other line card present in the traffic shaping service node. In an exemplary embodiment with ten line cards, line card communications connection 1442 can forward data packets to any one of the other nine line cards. Line card 1440 receives the data packet at line card communication connection 1454. In addition, the line card communication receives feedback from processor cards 1402-1406 as updated network traffic policies. The Host CPU 1456 process the received network traffic policies and updates the network traffic policies used by network processor 1458. Network processor 1458 transmits the received data packet through physical interface 1460.

Figure 15:
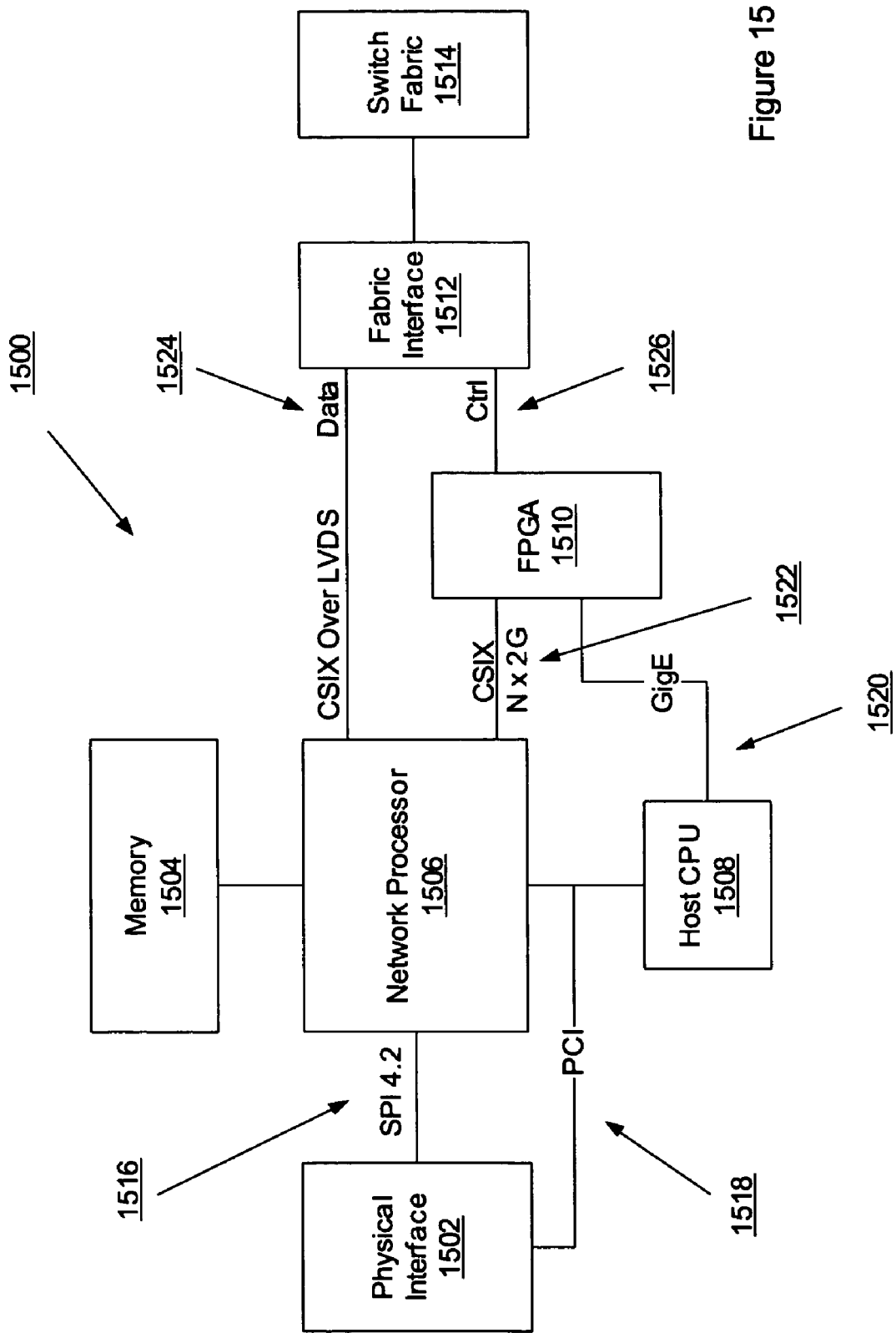
FIG. 15 is a block diagram illustrating architecture of a line card according to one embodiment of the invention.

FIG. 15 is a block diagram illustrating architecture of a line card 1500 according to one embodiment of the invention. In FIG. 15, the line card 1500 comprises a physical interface 1502 connected to the network processor 1506 via a Systems Packet Interface level 4-phase 2 (SPI 4.2) connection 1516. In an exemplary embodiment, physical interface 1502 comprises one OC-192, four OC-48, one 10 GigE or ten GigE ports, although physical interface 1502 is not limited to such ports. In one embodiment, network processor 1506 is an EZChip NP2 network processor. In another embodiment, network processor may be EZChip NP1C or another similar network processor. The host CPU 1508 connects to the physical interface 1502 via a peripheral component interface (PCI) 1518. Network processor 1506 has memory 1504 associated with the network processor 1506. The network processor 1506 connects to the fabric interface via data and control connections. First, a data connection between the network processor 1506 and the fabric interface 1512 is made through a common switch interface (CSIX) over a low voltage differential signaling (LVDS) connection 1524. Secondly, a control connection between the network processor 1506 and the fabric interface 1512 is made through a field programmable gate array (FPGA) 1510. The connection between the network processor 1506 and the FPGA 1510 is through a CSIX (N×2G) connection. The FPGA 1510 connects to the control port of the fabric interface 1512. The FPGA also connects to the Host CPU 1508 over a GigE interface. Of course, alternative embodiments use different architectures for line card 1500.

Figure 16:
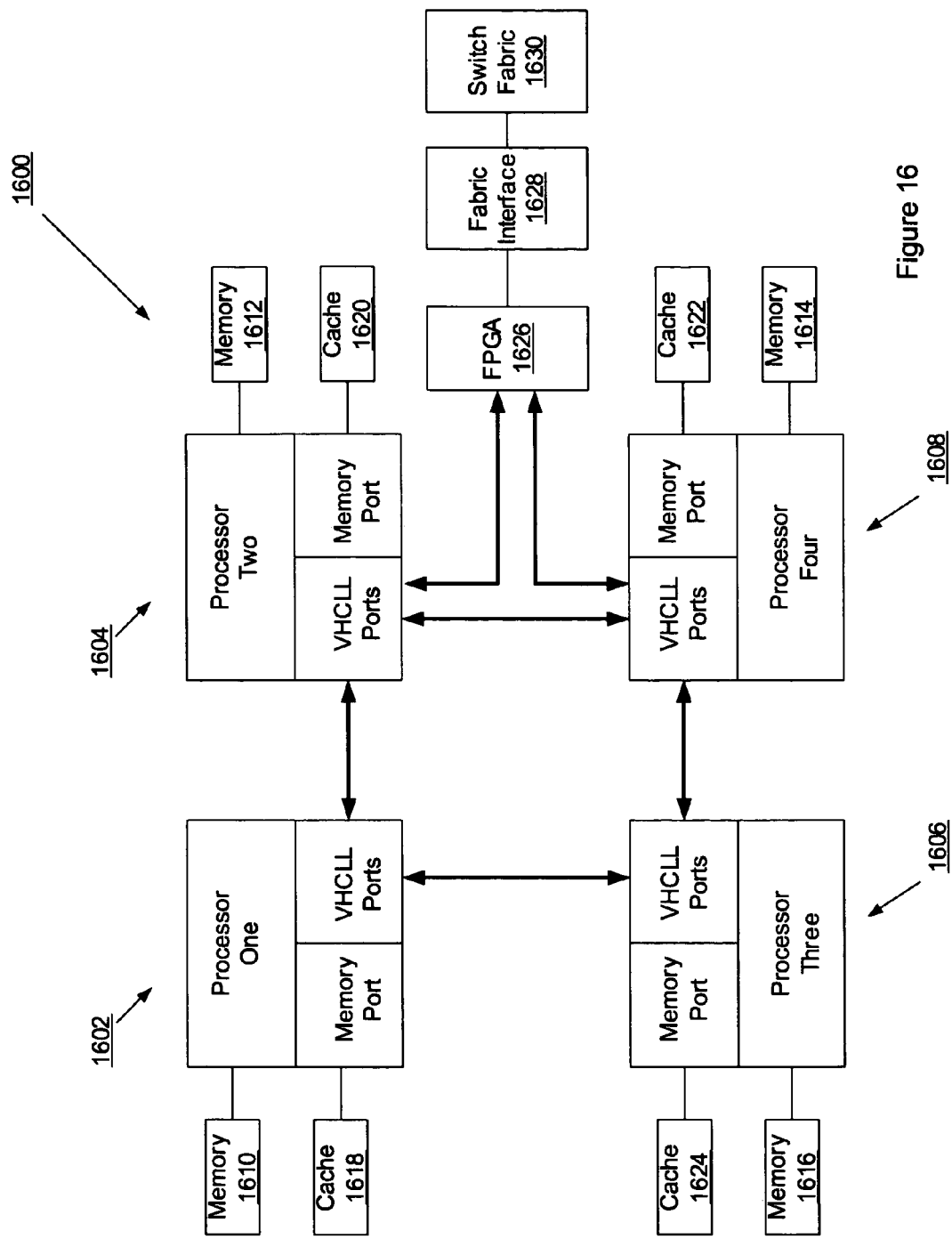
FIG. 16 is a block diagram illustrating architecture of a processor card according to one embodiment of the invention.

FIG. 16 is a block diagram illustrating architecture of a processor card 1600 according to one embodiment of the invention. In FIG. 16, by way of illustration, processor card 1600 comprises four processors (Processor 1602-1608). Processor card may contain more or less processors, depending on the computing resources of each processor. Processors can be one of, but not limited to, AMD OPTERON, TRANSMETA EFFICEON, Broadcom 1280 MIPS, Broadcom 1480 MIPS, and MPC 8540 (RAPIDIO). Each processor has a memory port and a VHCLL port. The memory port connects each processor to the dedicated processor cache 1618-1624. Furthermore, each processor has its own dedicated memory 1610-1616. The VHCLL port from processors 1604 and 1608 connect to the processor card FPGA 1626. The FPGA 1626 connects to the fabric interface 1628, which in turn connects to the switch fabric 1630. Of course, alternative embodiments use different architectures for processor card 1600.

This implementation of the application aware traffic shaping service node is an example, and not by way of limitation. Thus, network elements having other architectural configurations can incorporate embodiments of the invention. Examples of other network elements that could incorporate embodiments of the invention could have multiple forwarding cards or have a single line card incorporating the functionality of both the forwarding and the controlling. Moreover, a network element having the forwarding functionality distributed across the traffic cards could incorporate embodiments of the invention.

The traffic as well as the line cards, and processor cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Alternative Embodiments

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus, comprising: a plurality of line cards each including: a physical interface; and a set of one or more network processors coupled to the physical interface to classify incoming traffic into application level subscriber flows, to generate statistics based on deep packet inspection on the incoming traffic, to shape outgoing traffic by enforcing traffic policies, and to adjust bandwidth allocated to the outgoing traffic based on the traffic policies, wherein deep packet inspection includes inspecting the incoming traffic at one or more of a session layer, a presentation layer, or an application layer, wherein a first portion of the statistics are generated based on a short-term sliding window and a second portion of the statistics are generated based on a long-term basis; a plurality of processor cards each including one or more policy generator processors to receive the statistics from the plurality of line cards based on the deep packet inspection, to update the traffic policies in real-time based on the statistics received from the plurality of line cards, and to provide updated traffic policies to the plurality of line cards; and a full mesh communication infrastructure coupling the plurality of line cards and the plurality of processor cards.

2. The apparatus of claim 1, wherein the full mesh communication infrastructure comprises:
a packet flow communication infrastructure coupling the plurality of line cards to each other, where each of the links of the packet flow communication infrastructure has a core capacity; and
a status/policy communication infrastructure coupling each of plurality of line cards with the plurality of processor cards, wherein each link of the status/policy communications infrastructure is of the core capacity as the links of the packet flow communications infrastructure.

3. The apparatus of claim 1, wherein one or more of the plurality of line cards further comprises a statistic queue coupled to the set of network processors to store statistics regarding results of the deep packet inspection.

4. The apparatus of claim 3, wherein one or more of the plurality of line cards is coupled with the statistic queue.

5. The apparatus of claim 1, wherein one or more of the plurality of line cards further comprises a host processor coupled to the set of network processors to provide the traffic policies.

6. The apparatus of claim 5, wherein one or more of the plurality of line cards is coupled with the statistic queue.

7. The apparatus of claim 1, wherein one or more of the plurality of line cards further comprises a protocol queue coupled to the set of network processors to store protocol information regarding the results of the deep packet inspection.

8. The apparatus of claim 1, wherein one or more of the plurality of line cards further comprises a very high capacity low latency bus coupled to the policy generator processors and the full mesh communications infrastructure, wherein the very high capacity low latency bus to provide high bandwidth communication between the policy generator processors and the full mesh communications infrastructure.

9. A method comprising: receiving, at a plurality of ingress line cards of a network node, a plurality of traffic flows; generating a set of statistics, on the plurality of ingress line cards, based on deep packet inspection of the plurality of traffic flows, wherein deep packet inspection includes inspecting the incoming traffic at one or more of a session layer, a presentation layer, or an application layer, wherein a first portion of the statistics are generated based on a short-term sliding window and a second portion of the statistics are generated based on a long-term basis; forwarding the plurality of traffic flows to a plurality of egress line cards of the network node; continually updating traffic policies in real-time for the plurality of traffic flows by processing the set of statistics with a plurality of policy processors; enforcing the traffic policies on the plurality of traffic flows at least one of the plurality of ingress line cards or the plurality of egress line cards; adjusting bandwidths allocated to one or more of the plurality of traffic flows based on the traffic policies; and transmitting, at the plurality of egress line cards, the plurality of traffic flows based on the traffic policies.

10. The method of claim 9, wherein a transmitting rate for the transmitting the plurality of traffic flows is at least as great as a receiving rate for the receiving the plurality of traffic flows.

11. The method of claim 9, wherein the set of statistics is selected from the group consisting of network statistics, long-term subscriber statistics, short-term subscriber statistics and application statistics.

12. The method of claim 9, further comprising a passthrough mode, the passthrough mode receives and transmits traffic flows as if there were no traffic policies.

13. The method of claim 9, wherein the traffic flows are application level traffic flows.

14. A network comprising: a first network; a second network; a remote access policy server; and a network device coupled to the remote access policy server to receive subscriber and application policies and coupled between the first and second networks, wherein the network device comprises: a plurality of line cards each including a physical interface; and a set of one or more network processors coupled to the physical interface to classify incoming traffic into traffic flows, to generate statistics based on deep packet inspection on the incoming traffic, to shape outgoing traffic based on traffic policies, and to adjust bandwidth allocations to the outgoing traffic based on the traffic policies, wherein deep packet inspection includes inspecting the incoming traffic at one or more of a session layer, a presentation layer, or an application layer, wherein a first portion of the statistics are generated based on a short-term sliding window and a second portion of the statistics are generated based on a long-term basis; a plurality of processor cards each including one or more policy generator processors, coupled with the plurality of line cards, to receive the statistics, to update the traffic policies in real-time based on the statistics received from the plurality of line cards, and to provide updated traffic policies to the plurality of line cards; and a full mesh communication infrastructure coupling the plurality of line cards and the plurality of processor cards.

15. The apparatus of claim 14, wherein the full mesh communication infrastructure comprises:
   a packet flow communication infrastructure coupling the plurality of line cards to each other, where each of the links of the packet flow communication infrastructure has a capacity; and
   a status/policy communication infrastructure coupling each of plurality of line cards with the plurality of processor cards, wherein each link of the status/policy communications infrastructure is of the core capacity as the links of the packet flow communications infrastructure.

16. The apparatus of claim 14, wherein one or more of the plurality of line cards further comprises a statistic queue coupled to the set of network processors to store statistics regarding results of the deep packet inspection.

17. The apparatus of claim 16, wherein one or more of the plurality of line cards is coupled with the statistic queue.

18. The apparatus of claim 14, wherein one or more of the plurality of line cards further comprises a host processor coupled to the set of network processors to provide the policies.

19. The apparatus of claim 18, wherein one or more of the plurality of line cards is coupled with the statistic queue.

20. The apparatus of claim 14, wherein one or more of the plurality of line cards further comprises a protocol queue coupled to the set of network processors to store protocol information regarding the results of the deep packet inspection.

21. The apparatus of claim 14, wherein one or more of the plurality of line cards further comprises a very high capacity low latency bus coupled to the policy generator processors and the full mesh communications infrastructure, wherein the very high capacity low latency bus to provide high bandwidth communication between the policy generator processors and the full mesh communications infrastructure.

* * * * *